US011331799B1

(12) United States Patent
Shafer

(10) Patent No.: US 11,331,799 B1
(45) Date of Patent: May 17, 2022

(54) DETERMINING FINAL GRASP POSE OF ROBOT END EFFECTOR AFTER TRAVERSING TO PRE-GRASP POSE

(71) Applicant: X Development LLC, Mountain View, CA (US)

(72) Inventor: Alex Shafer, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 169 days.

(21) Appl. No.: 16/886,583

(22) Filed: May 28, 2020

Related U.S. Application Data

(60) Provisional application No. 62/955,702, filed on Dec. 31, 2019.

(51) Int. Cl.
   *B25J 9/16* (2006.01)
   *B25J 15/00* (2006.01)

(52) U.S. Cl.
   CPC ............ *B25J 9/163* (2013.01); *B25J 9/1612* (2013.01); *B25J 9/1664* (2013.01); *B25J 9/1697* (2013.01); *B25J 15/00* (2013.01)

(58) Field of Classification Search
   CPC ........ B25J 9/163; B25J 9/1612; B25J 9/1664; B25J 9/1697; B25J 15/00
   USPC .................................................. 700/245–264
   See application file for complete search history.

(56) References Cited

U.S. PATENT DOCUMENTS

| | | | | |
|---|---|---|---|---|
| 4,980,626 | A * | 12/1990 | Hess ...................... | B25J 9/1005 250/559.33 |
| 8,406,923 | B2 * | 3/2013 | Ueyama ................. | B25J 9/1697 700/259 |
| 9,095,978 | B2 * | 8/2015 | Shi ......................... | B25J 9/1664 |
| 9,399,291 | B2 * | 7/2016 | Shi ......................... | B25J 9/1612 |
| 10,131,051 | B1 * | 11/2018 | Goyal .................... | B25J 9/1697 |
| 10,850,392 | B2 * | 12/2020 | Hager .................. | B25J 15/0009 |
| 10,864,631 | B2 * | 12/2020 | Davidson ................ | B25J 9/161 |
| 11,173,602 | B2 * | 11/2021 | Odhner ............... | B25J 15/0009 |
| 2006/0012198 | A1 * | 1/2006 | Hager .................. | B25J 15/0009 294/106 |
| 2009/0234502 | A1 * | 9/2009 | Ueyama ................. | B25J 9/1697 700/259 |

(Continued)

OTHER PUBLICATIONS

Chang, Lillian Y., et al.; Planning Pre-Grasp Manipulation for Transport Tasks; 8 pages; ICRA; dated 2010.

(Continued)

*Primary Examiner* — Jaime Figueroa
(74) *Attorney, Agent, or Firm* — Middleton Reutlinger

(57) ABSTRACT

Grasping of an object, by an end effector of a robot, based on a final grasp pose, of the end effector, that is determined after the end effector has been traversed to a pre-grasp pose. An end effector vision component can be utilized to capture instance(s) of end effector vision data after the end effector has been traversed to the pre-grasp pose, and the final grasp pose can be determined based on the end effector vision data. For example, the final grasp pose can be determined based on selecting instance(s) of pre-stored visual features(s) that satisfy similarity condition(s) relative to current visual features of the instance(s) of end effector vision data, and determining the final grasp pose based on pre-stored grasp criteria stored in association with the selected instance(s) of pre-stored visual feature(s).

20 Claims, 7 Drawing Sheets

(56) References Cited

U.S. PATENT DOCUMENTS

| | | | |
|---|---|---|---|
| 2013/0041502 A1* | 2/2013 | Shi | B25J 15/0009 |
| | | | 700/245 |
| 2013/0184870 A1* | 7/2013 | Ota | B25J 9/1669 |
| | | | 700/262 |
| 2014/0163731 A1* | 6/2014 | Shi | B25J 9/1669 |
| | | | 700/250 |
| 2015/0367514 A1* | 12/2015 | Shi | B25J 9/1669 |
| | | | 700/250 |
| 2017/0320210 A1* | 11/2017 | Ding | B25J 9/1664 |
| 2020/0061811 A1* | 2/2020 | Iqbal | B25J 9/161 |
| 2020/0094405 A1* | 3/2020 | Davidson | B25J 9/161 |
| 2020/0130935 A1* | 4/2020 | Wagner | G05B 19/41 |
| 2020/0316782 A1* | 10/2020 | Chavez | B25J 9/1697 |
| 2020/0361083 A1* | 11/2020 | Mousavian | B25J 9/1612 |
| 2021/0031375 A1* | 2/2021 | Drumwright | B25J 9/1676 |
| 2021/0101286 A1* | 4/2021 | Lee | B25J 9/1605 |
| 2021/0125052 A1* | 4/2021 | Tremblay | B25J 18/00 |
| 2021/0138655 A1* | 5/2021 | Mousavian | G06T 7/50 |
| 2021/0237266 A1* | 8/2021 | Kalashnikov | B25J 9/1612 |

OTHER PUBLICATIONS

Chang, Lillian Y., et al.; Posture Optimization for Pre-Grasp Interaction Planning; 6 pages; ICRA; dated 2011.

Ciocarlie, Matei T. et al.; Hand Posture Subspaces for Dexterous Robotic Grasping; Department of Computer Science; pp. 851-867; dated Jul. 2009.

Vahrenkamp, Nikolaus et al.; Simultaneous Grasp and Motion Planning; Simultaneous Grasp and Motion Planning; pp. 1-11; dated 2012.

Hsiao, Kaijen et al.; Contact-Reactive Grasping of Objects with Partial Shape Information; 8 pages; dated 2010.

Leeper, Adam et al.; Using Near-Field Stereo Vision for Robotic Grasping in Cluttered Environments; 15 pages; dated 2014.

* cited by examiner

US 11,331,799 B1

DETERMINING FINAL GRASP POSE OF ROBOT END EFFECTOR AFTER TRAVERSING TO PRE-GRASP POSE

BACKGROUND

Many robots are programmed to utilize one or more end effectors to grasp one or more objects. For example, a robot can utilize a grasping end effector such as an "impactive" grasping end effector (e.g., jaws, claws, fingers, and/or bars that grasp an object by direct contact upon the object) or "ingressive" grasping end effector (e.g., physically penetrating an object using pins, needles, etc.) to pick up an object from a first location, move the object to a second location, and drop off the object at the second location. Some additional examples of robot end effectors that may grasp objects include "astrictive" grasping end effectors (e.g., using suction or vacuum to pick up an object) and one or more "contigutive" grasping end effectors (e.g., using surface tension, freezing or adhesive to pick up an object), to name just a few. While humans innately know how to correctly grasp many different objects, determining an appropriate manner to grasp an object for manipulation of that object can be a difficult task for robots.

Some approaches to robotic grasping involve generating, based on vision data from a vision component of the robot, a grasp pose for grasping of an object. The vision component is often a primary (or only) vision component on a head or body of the robot. For example, in some of those approaches the grasp pose can be determined based on processing the vision data using a trained machine learning model to generate output that indicates a three-dimensional (3D) grasp point on the object, where the 3D grasp point indicates a 3D location for an end effector when attempting to grasp the object. For instance, when the end effector is an impactive end effector with two opposed fingers, the 3D location can indicate a midpoint between the fingers when the grasp is attempted. As another example, when the end effector is an astrictive end effector with a suction cup, the 3D location can indicate a center point for contact by the suction cup. An orientation of the end effector for the grasp pose can also optionally be determined, either using the output from the machine learning model or using heuristic techniques. As another example, the grasp pose can be determined based on matching the vision data to a 3D model of the object, and determining the grasp pose based on the 3D model of the object (e.g., the grasp pose can be pre-stored with the 3D model).

Further, in those and other approaches, a "pre-grasp" pose is determined based on the grasp pose. For example, the pre-grasp pose can conform to the grasp pose, but be offset "back" X meters (e.g., 0.1 meters) from the grasp pose. When the pre-grasp pose is reached, the end effector can then move along a Z-axis (where the Z-axis is in a frame of the end effector) until contact with the object and/or threshold proximity to the object is detected, then a grasp attempted. In some implementations, in determining the pre-grasp pose, a surface normal can be determined for a 3D point of the grasp pose, and the pre-grasp pose is offset in a direction that is along the surface normal.

While such approaches lead to successful grasps in some scenarios and/or for some objects, they have drawbacks that can result in grasp failure for other scenarios and/or for other objects. For example, there is often some error in traversing the end effector to the pre-grasp pose (e.g., due to inaccuracies of actuators and/or calibration issues), meaning that even though control commands are provided to cause the end effector to traverse to a pre-grasp pose, the end effector will often not be exactly at the pre-grasp pose as intended. Put another way, there can be an error between the instructed pre-grasp pose and the actual pose traversed to by the end effector, such as a 0.1-2.0 centimeter error. This can result in an error in the grasp pose, as moving along the Z-axis will also result in an error. Also, for example, the vision data on which the grasp pose (and thus, the pre-grasp pose) is based can be noisy and/or include occlusions, which can result in errors in generating the grasp pose and pre-grasp pose. In view of these and/or other drawbacks, grasp success rate for various objects and/or in various scenarios can be relatively low (e.g., 60% or less).

SUMMARY

Implementations disclosed herein are directed to determining a final grasp pose, of a robot end effector, after the end effector has been traversed to a pre-grasp pose. Those implementations can utilize an end effector vision component to capture instance(s) of end effector vision data after the end effector has been traversed to the pre-grasp pose, and can determine the final grasp pose based on the end effector vision data. For example, the final grasp pose can be determined based on selecting instance(s) of pre-stored visual features(s) that satisfy similarity condition(s) relative to current visual features of the instance(s) of end effector vision data, and determining the final grasp pose based on pre-stored grasp criteria stored in association with the selected instance(s) of pre-stored visual feature(s). Also, for example, the final grasp pose can additionally or alternatively be determined based on processing, using a trained machine learning model, an instance of end effector vision data and/or corresponding visual feature(s) thereof to generate output that indicates the final grasp pose and/or a predicted success measure for the final grasp pose.

As mentioned above, implementations disclosed herein are utilized on a robot that includes an end effector vision component. The end effector vision component is coupled to an end effector of the robot or coupled to a link that is near the end effector (e.g., one link "upstream" from the end effector). While the pose of the end effector vision component can optionally be independently adjustable relative to the end effector or the link (e.g., it may be panned and/or tilted relative thereto), the end effector vision component translates along with the end effector. Put another way, movement of the end effector in Cartesian space will cause a corresponding movement of the end effector vision component in Cartesian space. The end effector vision component is utilized to capture end effector vision data.

In some implementations, the end effector vision data can include two-dimensional (2D) vision data, and optionally depth data for some or all of the pixels of the 2D data. For example, the vision component can include an active or passive stereographic camera and can generate 2.5D (2D, with depth) vision data. Also, for example, the vision component can include a monographic camera paired with a depth sensor and can generate 2D vision data using the monographic camera, and depth data, utilizing the depth sensor, for at least some pixels of the 2D vision data. As yet another example, the vision component can include a monographic camera that can capture 2D vision data from multiple vantages to generate 2.5D vision data. Put another way, the monographic camera can be effectively utilized as a passive stereographic camera, with a pair of vantages of the monographic being considered as an instance of stereo vision data (e.g., using a determined baseline and angle between the pair as the stereo baseline and angle).

Implementations capture one or more instances of end effector vision data using the end effector vision component and capture the instance(s) of end effector vision data after control commands are provided to traverse the end effector to a pre-grasp pose for grasping an object. The pre-grasp pose can be one determined using one or more techniques, such as those described above. As described herein, the actual pose of the end effector after commands are provided to traverse the end effector to the pre-grasp pose can be the pre-grasp pose, or can be offset slightly from the pre-grasp pose due to calibration issues, actuator slippage or inaccuracies, and/or other consideration(s). Accordingly, traversing the end effector to the pre-grasp pose and/or providing control commands to traverse the end effector to the pre-grasp pose, as used herein, references attempts to traverse the end effector to the pre-grasp pose, which can result in the end effector being in an actual pose. The actual pose can be the intended pre-grasp pose, or one that is slightly offset therefrom.

The end effector vision data can be captured at the actual pose traversed to by the end effector and/or additional pose(s) near the actual pose. One or more current visual features are then determined based on processing the end effector vision data. The current visual features can include detected edges, detected corners, detected interest points, detected shape(s) (e.g., line(s), ellipsis(es), handle shape(s), and/or arbitrary shape(s)), and/or other visual feature(s). The current visual features can be determined using one or more vision processing techniques. For example, edge(s) can be detected using a Canny edge detector and/or other edge detection technique(s). As another example, shape(s) can be detected using a Hough Transform and/or other shape(s) detection technique(s). For instance, circle(s) in vision data can be detected using a Circle Hough Transform.

In some implementations, multiple instances of end effector vision data are captured, and corresponding current visual features determined for each instance. For example, a first instance of end effector vision data can be captured at the actual pose and first current visual features determined based on the first instance, a second instance of end effector vision data can be captured at an additional pose near the actual pose (e.g., after traversing the end effector a small distance) and second current visual features determined based on the second instance, etc. In some of those implementations, capturing the additional instance(s) of vision data can be responsive to determining that no visual features can be determined based on the preceding instance(s) and/or that no satisfactory final grasp pose can be determined based on the visual feature(s) of the preceding instance(s). In some additional or alternative implementations, visual features can be determined based on two or more instances of end effector vision data. For example, the end effector vision component can include a monographic camera, two instances of vision data can be used to generate an instance of 2.5D end effector vision data, and the visual features determined based on the instance of 2.5D end effector vision data.

An instance of current visual features can be compared to a plurality of instances of pre-stored visual features (e.g., 10, 20, 30, or more instances of pre-stored features) to determine one or more pre-stored visual features (if any) that satisfy similarity threshold(s) relative to the instance of current visual features. In some implementations, only one instance of the pre-stored visual features is selected and is selected based on it being the most similar (amongst the plurality of pre-stored visual features) to the current visual features (a relative similarity threshold), and optionally based on it satisfying an absolute similarity threshold (e.g., that it is "close enough" to the current visual features). In some other implementations, more than one of the instances of pre-stored visual features can be selected. For example, two or more of the instances of pre-stored visual features can be selected based on each of the selected instances satisfying an absolute similarity threshold.

The pre-stored visual features can include edges, corners, interest points, shape(s) (e.g., line(s), ellipsis(es), handle shape(s), and/or arbitrary shape(s)), and/or other feature(s). For example, a first instance of pre-stored visual features can include features that define only a single line, a second instance of pre-stored visual features can include features that define only two parallel lines, a third instance of pre-stored visual features can include features that define only a single circle, a fourth instance of pre-stored visual features can include features that define only two concentric circles, etc.

One or more visual comparison techniques can be utilized to determine similarity measure(s) between an instance of current visual features and an instance of pre-stored visual features. As one example, one or more distance measure(s) can be determined between the current and pre-stored visual feature(s), and the similarity measure determined as a function of the distance measure(s) (i.e., with smaller distance measure(s) indicating greater similarity). As another example, an instance of current visual features can be processed using a neural network model, that is trained to generate rich embeddings/encodings of vision data, to generate a current embedding (in a lower-dimensional space) of the current visual features. A pre-stored embedding for an instance of pre-stored visual features can similarly be generated by processing the instance using the neural network model to generate the pre-stored embedding (in the lower-dimensional space) of the pre-stored visual features. A distance measure, in embedding space, between the current embedding and the pre-stored embedding can be determined, and the similarity measure determined as a function of the distance measure (i.e., with smaller distance measures indicating greater similarity). Optionally, the pre-stored embeddings of visual features can be previously generated and pre-stored with the pre-stored visual features, to reduce latency and/or utilization of robot processor(s) at run-time.

Each instance of pre-stored visual features has one or more corresponding grasp pose criteria associated therewith, such as manually engineered grasp pose criteria. Grasp pose criteria for an instance of pre-stored visual features can define at least one or more two-dimensional (2D) or three-dimensional (3D) grasp points/positions relative to the instance of pre-stored visual features. As one example, for pre-stored visual features that define only a circle shape that is of a size that is less than a grasp width of an end effector with opposed claws (e.g., top view of a "bottle top"), the grasp pose criteria can define a 2D or 3D grasp point that is at the center of the circle shape (e.g., fingers on each side of the circle). As another example, for pre-stored visual features that define only a circle shape that is of a size that is greater than a grasp width of an end effector with opposed claws (e.g., top view of bowl) and can have engineered grasp pose criteria that indicate a grasp point should be on a circumference of the circle (e.g., fingers on each side of a portion of the circumference). For instance, the grasp criteria can define one or more grasp points along the circumference of the circle, or define the entire circumference of the circle as a valid grasp point. As yet another example, for pre-stored visual features that define only one straight line, the grasp pose criteria can define one or more 2D or 3D points that are each on the straight line. Notably, each instance of visual features can correspond to a plurality of different objects. Put another way, end effector vision sensor data can be determined at a relatively close range and, as a result, the determined visual features are "local". Accordingly, local visual features for Object 1 can be considered to satisfy a similarity threshold of a given instance of visual features and local features for disparate Object 2 can also be considered to satisfy the similarity threshold of the given instance of visual features.

Grasp pose criteria can optionally define one or more additional or alternative grasp criteria that are in addition to grasp point(s). As one example, the grasp pose criteria pre-stored in association with an instance of pre-stored visual features can include one or more components of a grasp orientation such as roll, pitch, and/or yaw. The component(s) of a grasp orientation can be defined relative to the instance of pre-stored visual features and/or relative to the 2D or 3D grasp point. For instance, for pre-stored visual features that define only a circle shape that is of a size that is less than a grasp width of an end effector with opposed claws, the grasp pose criteria can define roll and pitch for the 2D or 3D grasp point. The roll and pitch can cause a Z-axis of the end effector (where the Z-axis is in the tool frame) to be perpendicular to a circular plane defined by the circle shape. As another example, the grasp pose criteria pre-stored in association with an instance of pre-stored visual features can define an extent to which digits of an impactive end effector should be opened (e.g., a distance between distal ends of opposed claws when at a grasp point). As yet another example, the grasp pose criteria pre-stored in association with an instance of pre-stored visual features can define a force with which an impactive grasp should be attempted, or a vacuum level with which an astrictive grasp should be attempted.

The pre-stored grasp criteria stored in association with the selected instance(s) of pre-stored visual features can then be used to determine candidate grasp pose(s). In determining a candidate grasp pose based on pre-stored grasp criteria, the current visual features can be utilized and/or an initially determined grasp pose (used in determining the pre-grasp pose) can be utilized. For example, assume current visual features that define a circle shape, and selected pre-stored visual features that also define a circle shape and that have associated grasp pose criteria that define a 3D grasp point that is at the center of the circle shape. A candidate 3D point of a candidate grasp pose can be generated by determining the center of the circle shape in the current visual features. Put another way, the relative definition of the 3D grasp point in the grasp pose criteria (at center of the circle) can be used to determine a candidate 3D point that is "at the center of the circle" of the current visual features.

As another example, assume current visual features that define a straight line and selected pre-stored visual features that also define a straight line and that have associated grasp pose criteria that define multiple 3D points that are each on the straight line. A candidate 3D point of a candidate grasp pose can be generated by determining a 3D point that is on the straight line in the current visual features. Optionally, the 3D point can be selected, from multiple 3D points that are on the straight line in the current visual features, based also on considering distance of the 3D point to an initial 3D point of the initially determined grasp pose. For example, the 3D point can be selected based on it being on the straight line in the current visual features and being the closest to the initial 3D point, amongst all considered 3D points on the straight line in the current visual features. In these and other manners, the initially determined grasp pose can be used to guide determination of the candidate grasp pose (e.g., by ensuring it is not too far away from the initially determined grasp pose), but will not strictly dictate the candidate grasp pose. It is noted that when the pre-stored grasp criteria define a 2D point, the candidate grasp pose can be determined as a 3D point by projecting that 2D point into 3D space (e.g., using 2.5D vision data).

After candidate grasp pose(s) are determined (e.g., at least one candidate grasp pose determined based on each selected instance of pre-stored visual features), a final grasp pose is determined based on one or more of the candidate grasp poses. For example, only one candidate grasp pose can be determined, and it can be utilized as the final grasp pose. Its utilization can optionally be contingent on it satisfying a distance threshold relative to an initial grasp pose (e.g., a transformation between the two poses is less than a distance threshold). As another example, multiple candidate grasp poses can be determined, and only one selected as the final grasp pose. For instance, the one with the smallest distance relative to the initial grasp pose can be selected, or one can be randomly (truly random or pseudo-random) selected. Also, for instance the one with the best predicted grasp success measure can be selected. A predicted grasp success measure for each candidate grasp pose can be generated based on processing the candidate grasp pose, and a corresponding instance of end effector vision data (or visual features determined based thereon), using a machine learning model trained as described herein. As yet another example, multiple candidate grasp poses can be determined, and the final grasp pose determined as a function of the multiple grasp poses. For example, the final grasp pose can be a weighted or unweighted average of the multiple grasp poses.

After the final grasp pose is determined, a grasp path from a current end effector pose (which can be the actual pose, or a pose nearby) to the final grasp pose can then be generated and checked for kinematic feasibility. For example, the grasp path (and/or a trajectory generated based on the grasp path) can be analyzed to determine whether its traversal would violate any joint limits, torque limits, and/or other kinematic limit(s) of the robot. If so, it can be determined to be not kinematically feasible. If not, it can be determined to be kinematically feasible. If kinematically feasible, the grasp path can then be implemented by providing corresponding control commands to actuators of the robot, and a grasp attempted once the end effector arrives at the grasp pose (and/or after contact and/or threshold proximity detected). If determined to not be kinematically feasible, the current grasp attempt can be aborted. When aborted, a base of the robot can optionally be moved and the grasp attempt reattempted (e.g., by performing another iteration of techniques described above). It is noted that in implementations where the kinematic feasibility of the grasp path is checked prior to causing the path to be implemented, the grasp attempt can be aborted before any of the grasp path is traversed. This can prevent usage of power resources and wear and tear on the robot that would otherwise occur to traverse part of the path, only to abort at some point due to kinematic infeasibility. Moreover, it is noted that visual servoing and/or other techniques are unable to pre-calculate a path to the grasp pose and, as a result, utilization of visual servoing can cause late aborting of a grasp attempt and unwarranted usage of power resources and excess wear and tear.

In some implementations, end effector vision data is captured initially at the actual pose (the pose arrived at in attempting to traverse to the pre-grasp pose), an instance of current visual features determined based on the end effector vision data, and those features compared to the instances of visual features to determine if one or more of the instances satisfy similarity threshold(s) relative to the instance of current visual features. If so, the corresponding pre-grasp criteria of those instance can be utilized in generating candidate grasp pose(s) and determining a final grasp pose based on the candidate grasp pose(s). If not, the end effector can be moved, an additional instance of end effector vision data captured, additional features determined based on the additional instance of end effector vision data, and those additional features compared to the instances of visual features to determine if one or more of the instances satisfy similarity threshold(s) relative to the additional instance of current visual features. This general process can continue until a sufficiently close match is determined, or a maximum number of iterations attempted (in which the grasp attempt can be aborted). In some additional or alternative implementations, multiple instances of end effector vision data are captured, corresponding visual features determined for each, and corresponding grasp feature(s) determined for any that sufficiently match a corresponding set of visual features. A grasp pose can then be determined as a function of the multiple corresponding grasp features. For example, each grasp feature can indicate a corresponding grasp point, an average grasp point determined as a function of the corresponding grasp points, and the grasp pose determined based on the average grasp point.

In some implementations, grasps attempted using the above techniques are "labeled" as successful or unsuccessful. For example, they can be automatically labeled using automated technique(s) that determine whether a grasp is successful based on an end effector "closing extent" when attempting a grasp (e.g., grasp unsuccessful if close all the way, otherwise successful), end effector torque reading(s) when attempting a grasp (e.g., torque spike when partially closed indicates success), and/or based on capturing additional end effector vision sensor data after the grasp and "lifting" (e.g., to determine if an object still in field of view). In those implementations, the end effector vision data and the utilized grasp pose can be stored, along with the grasp success label. This data can be used to generate corresponding training instance(s), and a machine learning model trained based on the training instance(s). The machine learning model, once trained, can be used to process end effector vision data (or features determined based thereon) and predict a final grasp pose. For example, the machine learning model can be used to process vision data and predict x & y coordinates (and optionally z) of grasp point(s) (e.g., in a "vision data frame") and optionally to predict an end effector "rotation" value (i.e., about the z axis) and/or other orientation value(s). As another example, the machine learning model can be used to process vision data (or features based thereon) and a candidate grasp pose and generate a value that indicates likelihood of successful grasp using the candidate grasp pose and in view of the vision data (or features based thereon). Once the ML model is trained, it can be used in predicting grasp poses in lieu of (or in addition to) utilizing the pre-stored instances of visual features described herein. As one non-limiting example, multiple candidate poses can be determined utilizing the pre-stored instances of visual features, then one of the candidate poses selected using a trained machine learning model that predicts a grasp success measure based on processing a corresponding grasp pose and a corresponding instance of end effector vision data (or features based thereon). For instance, each of the multiple candidate poses can be processed, using the machine learning model and along with corresponding vision data, and the one with the best resulting grasp success measure selected for utilization in generating a grasp path.

The preceding is provided as an example of various implementations described herein. Additional description of those implementations, and of additional implementations, are provided in more detail below.

Some implementations can include a non-transitory computer readable storage medium storing instructions executable by a processor (e.g., a central processing unit (CPU) or graphics processing unit (GPU)) to perform a method such as one or more of the methods described herein. Yet another implementation can include one or more computers and/or one or more robots that include one or more processors operable to execute stored instructions to perform a method such as one or more (e.g., all) aspects of one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
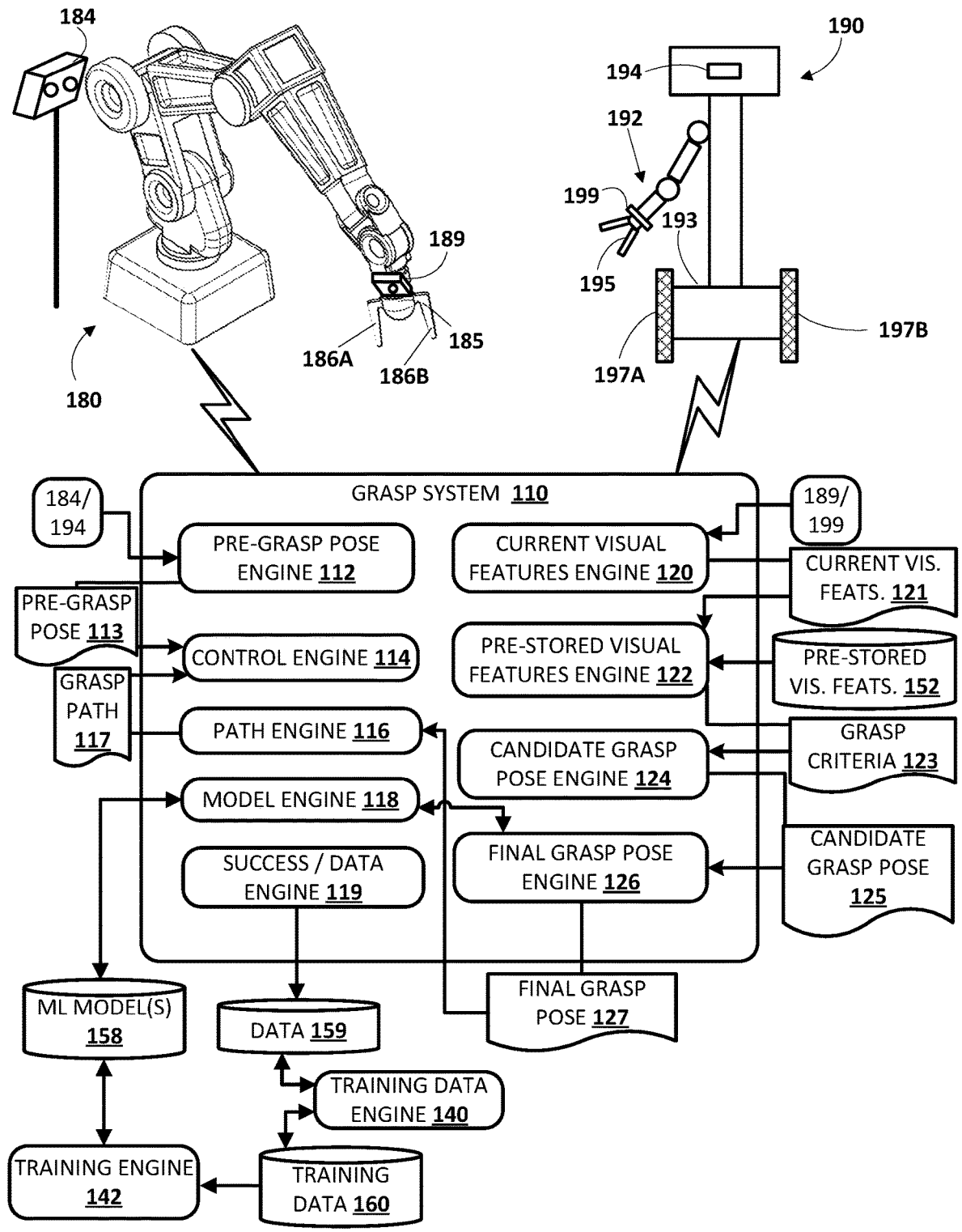
FIG. 1 illustrates an example environment in which implementations disclosed herein can be implemented.

FIG. 1 illustrates an example environment in which an object can be grasped by an end effector of a robot (e.g., robot 180, robot 190, and/or other robots). The object can be grasped in accordance with techniques implemented by grasp system 110. For example, an instance of the grasp system 110 implemented on the robot 180 can: generate a pre-grasp pose based on first vision sensor data from a first vision component 184; provide initial control commands that direct an end effector 185 of the robot 180 to traverse to the pre-grasp pose; subsequent to providing the initial commands and prior to attempting the grasp of the object, capture instance(s) of end effector vision sensor data using an end effector vision component 189; generate instance(s)

of current visual features based on the instance(s) end effector vision sensor data; determine candidate grasp pose(s) using grasp criteria pre-stored in association with instance(s) of pre-stored visual feature(s) that satisfy similarity condition(s) relative to the instance(s) of the current visual features; and determine a final grasp pose based on the candidate grasp pose(s). Further, the instance of the grasp system 110 can calculate a grasp path to move the end effector 185 to the final grasp pose and, responsive to determining the path is kinematically feasible, cause the end effector 185 to traverse the grasp path in association with attempting a grasp of the object. The grasp system 110 is described in more detail below.

Example robots 180 and 190 are illustrated in FIG. 1. Robot 180 is a "robot arm" having multiple degrees of freedom to enable traversal of a grasping end effector 185 of the robot 180 along any of a plurality of potential paths to position the grasping end effector 185 in any one of a plurality of desired poses. As used herein, a pose of an end effector references at least a three-dimensional ("3D") pose of the end effector that specifies a position of the end effector (e.g., X, Y, Z position) and can optionally specify one or more additional dimension(s) that each define component(s) of an orientation of the end effector. For instance, the pose of the end effector can optionally be a full six-dimensional ("6D") pose of the end effector that specifies both a position and three orientation components (pitch, yaw, roll) of the end effector. Also, for instance, the pose of the end effector can optionally be a four-dimensional ("4D") pose of the end effector that specifies both a position and one orientation component (e.g., one of pitch, yaw, and roll). As yet another instance, the pose of the end effector can optionally be a five-dimensional ("5D") pose of the end effector that specifies a position and two orientation components (e.g., one of pitch, yaw, and roll). For clarity, it is noted that the end effector is, at any given state, definable with a full 6D pose. However, poses that are described herein and utilized in controlling the end effector (e.g., pre-grasp pose, candidate grasp pose, final grasp pose) can be defined with less than six-dimensions.

In some implementations, the position of the end effector (e.g., that referenced by a grasp point) can be the position of a reference point of the end effector. In some implementations, the reference point of an end effector may be a position that is not on the end effector itself but, rather, is defined with reference to component(s) of the end effector. For example, the reference point of an impactive end effector with two opposed claws can be a point that is between the two claws and between the bases and the distal ends of the claws. Also, for example, the reference point of a suction cup end effector can be a point that is at the center of the initially contacting portions of the suction cup (e.g., the center of a circle when the suction cup has a circular distal end). The reference point can alternatively be, for example, be a center of mass of the end effector and/or a point near where end effector attaches to other components of the robot. Other reference points can be utilized.

The pose of an end effector may be defined in various manners, such as in joint space and/or in Cartesian/configuration space. A joint space pose of an end effector may be a vector of values that define the states of each of the operational components that dictate the position of the end effector. A Cartesian space pose of an end effector may utilize coordinates or other values that define multiple degrees of freedom of the end effector relative to a reference frame (e.g., a world frame or a robot frame). It is noted that some robots may have kinematic redundancy and that more than one joint space pose of an end effector may map to the same Cartesian space pose of the end effector in those robots.

Robot 180 (e.g., processor(s) thereof) further controls two opposed actuable members 186A and 186B of the end effector 185 to actuate the actuable members 186A and 186B between at least an open position and a closed position (and/or optionally a plurality of "partially closed" positions). As described herein, robot 180 (e.g., processor(s) thereof) can control operational components thereof to attempt a grasp of an object in accordance with techniques implemented by grasp system 110. As used herein, an "operational component" of a robot may refer to actuators such as motors (e.g., servo motors), gear trains, pumps (e.g., air or liquid), pistons, drives, and/or other components that may create and/or undergo propulsion, rotation, and/or motion.

First vision component 184 is also illustrated in FIG. 1. In some implementations, first vision component 184 can be a stereographic camera, such as a passive or active stereographic camera. A stereographic camera can include two or more sensors (e.g., charge-coupled devices (CCDs)), each at a different vantage point and each generating image data. Each of the two sensors generates image data and the image data from each sensor at a given instance may be utilized to generate a two-dimensional ("2D") image at the given instance. Moreover, based on image data generated by the two sensors, two-and-a-half dimensional ("2.5D") vision data may also be generated in the form of a 2D image with a "depth" channel, where the values of the depth channel are generated based on comparing the pair of 2D images from the two sensors. In some other implementations, a stereographic camera may include only a single sensor and one or more mirrors utilized to effectively capture image data from two different vantage points. In various implementations, a stereographic camera may be a projected-texture stereo camera or other active stereo camera.

First vision component 184 is mounted at a fixed pose relative to the base or other stationary reference point of robot 180. The first vision component 184 has a field of view of at least a portion of the workspace of the robot 180, such as the portion of the workspace that is near grasping end effector 185. Although a particular mounting of first vision component 184 is illustrated in FIG. 1, additional and/or alternative mountings can be utilized. For example, in some implementations, first vision component 184 can be mounted directly to robot 180, such as on a non-actuable component of the robot 180.

End effector vision component 189 is also illustrated in FIG. 1, and is mounted on the end effector 185 of the robot 180. The end effector vision component 189 can have a field of view that captures at least an area in front of the end effector 185 (where "in front" is along a Z-axis of its tool frame, in a direction away from the link immediately upstream of the end effector 185). For example, vision sensor(s) of the vision component 189 can face a direction that is generally toward a distal end of the end effector 185, as opposed to generally toward the link immediately upstream of the end effector 185. In some implementations, the end effector vision component 189 can include an active or passive stereographic camera and can generate 2.5D (2D, with depth) vision data. In some other implementations, the end effector vision component 189 can alternatively include a monographic camera and can generate 2D vision data using the monographic camera. In some of those implementations, the end effector vision component 189 can also optionally include a depth sensor, and depth data, captured utilizing the depth sensor, can also be included in the end effector vision data for at least some pixels of the 2D vision data. In some other implementations, the end effector vision component 189 can include a monographic camera that can capture 2D vision data from multiple vantages to generate 2.5D vision data.

The robot 190 includes robot arm 192 with an end effector 195 that takes the form of a gripper with two opposing actuable members. The robot 190 also includes a base 193 with wheels 197A and 197B provided on opposed sides thereof for locomotion of the robot 190. The base 193 may include, for example, one or more motors for driving corresponding wheels 197A and 197B to achieve a desired direction, velocity, and/or acceleration of movement for the robot 190.

The robot 190 also includes a first vision component 194. The first vision component 194 can be, for example, a stereographic camera or a light detection and ranging (LIDAR) component. A LIDAR component includes one or more lasers that emit light and one or more sensors that generate vision data related to reflections of the emitted light, such as 3D point clouds. Robot 190 (e.g., processor(s) thereof) can control operational components to attempt a grasp of an object in accordance with techniques implemented by grasp system 110. For example, the robot 190 can control the wheels 197A and/or 197B, the robot arm 192, and/or the end effector 195 to grasp an object in accordance with techniques implemented by grasp system 110.

End effector vision component 199 is also illustrated in FIG. 1, and is mounted on a link, of the robot arm 192, that is immediately upstream of the end effector 195. The end effector vision component 199 can have a field of view that captures at least an area in front of the end effector 199. In some implementations, the end effector vision component 199 can include an active or passive stereographic camera and can generate 2.5D (2D, with depth) vision data. In some other implementations, the end effector vision component 199 can alternatively include a monographic camera and can generate 2D vision data using the monographic camera. In some of those implementations, the end effector vision component 199 can also optionally include a depth sensor, and depth data, captured utilizing the depth sensor, can also be included in the end effector vision data for at least some pixels of the 2D vision data. In some other implementations, the end effector vision component 199 can include a monographic camera that can capture 2D vision data from multiple vantages to generate 2.5D vision data.

Although particular robots 180 and 190 are illustrated in FIG. 1, additional and/or alternative robots may be utilized, including robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors.

Turning now to the grasp system 110 of FIG. 1, it is illustrated as separate from, but in communication with, both of robots 180 and 190. In some implementations, all or aspects of grasp system 110 may be implemented on robot 180 and/or robot 190 (e.g., via one or more processors of robots 180 and 190). For example, robots 180 and 190 may each include an instance of the grasp system 110. In some implementations, all or aspects of grasp system 110 may be implemented on one or more computer systems that are separate from, but in network communication with, robots 180 and/or 190. Moreover, in some of those implementations, each of the robots 180 and 190 may have their own dedicated instance of the grasp system 110.

The illustrated example of the grasp system 110 includes a pre-grasp pose engine 112, a control engine 114, a path engine 116, a model engine 118, a success/data engine 119, a current visual features engine 120, a pre-stored visual features engine 122, a candidate grasp pose engine 124, and a final grasp pose engine 126. One or more engines can be omitted and/or combined in various implementations. In some implementations, the grasp system 110 can perform one or more (e.g., all) of the blocks of method 200 of FIG. 2 (described below).

The pre-grasp pose engine 112 can generate a pre-grasp pose 113, for grasping an object, based at least in part on first vision data, that captures the object, and that is captured from a respective one of first vision component 184 or first vision component 194. In some implementations, the pre-grasp pose engine 112 generates an initial grasp pose based at least in part on the first vision data, then determines the pre-grasp pose 113 based on the initial grasp pose. For example, the pre-grasp pose 113 can conform to the grasp pose, but be offset X meters from the initial grasp pose in a direction that is along the surface normal of a grasp point of the initial grasp pose. Various techniques can be utilized to determine the initial grasp pose and/or the pre-grasp pose 113. As one non-limiting example, the initial grasp pose can be determined based on processing the first vision data using a trained machine learning model to generate output that indicates a three-dimensional (3D) grasp point on the object. An orientation of the end effector for the grasp pose can also optionally be determined, either using the output from the machine learning model or using heuristic techniques.

The pre-grasp pose 113 is provided to the control engine 114. The control engine 114 generates control commands based on the pre-grasp pose 113, and provides the control commands to robot actuators (of robot 180 or robot 190) to traverse a corresponding end effector (185 or 195) to the pre-grasp pose 113.

After the control engine 114 has provided the control commands to traverse the corresponding end effector (185 or 195) to the pre-grasp pose 113, current visual features engine 120 uses one or more instances of end effector vision data, captured from a respective one of end effector vision component 189 or 199, to generate one or more instances of current visual features. Only a single instance of current visual features 121 is illustrated in FIG. 1 for simplicity, but multiple instances can be generated as described herein. Instance(s) of end effector vision data can be captured at the actual pose arrived at after traversing to the pre-grasp pose and/or at additional pose(s) traversed to after the actual pose. In some implementations, the instance(s) of end effector vision data at additional pose(s) can optionally be captured responsive to determining preceding instance(s) of end effector vision data fail to generate sufficient (or any) visual features, that such visual features fail to satisfy similarity threshold(s) relative to pre-stored visual features, and/or that candidate grasp(s) generated thereon fail to satisfy one or more conditions. In generating the instance of current visual features 121, the current visual features engine 120 can process a corresponding instance of end effector vision data using one or more vision processing techniques, such as edge detection technique(s) and/or Hough Transform technique(s).

For the instance of current visual features 121, the pre-stored visual features engine 122 selects zero, one, two, or more than two instances of pre-stored visual feature(s), from pre-stored visual features database 152, based on the selected instance(s) of pre-stored visual features satisfying one or more conditions relative to the instance of current visual features 121. For example, for a given instance of current visual features 121, the pre-stored visual features engine 122 can select at least a given instance of pre-stored visual features 121 based on similarity measure(s) between the given instance of pre-stored visual features and the given instance of current visual features 121 satisfying similarity threshold(s) (e.g., absolute and/or relative). The pre-stored visual features database 152 can include a plurality of instances (e.g., 20 or more) of pre-stored visual features, and one or more corresponding grasp criteria can be assigned to each of the instances of pre-stored visual features.

The pre-stored visual features engine 122 can utilize one or more visual comparison techniques to determine similarity measure(s) between an instance of current visual features and an instance of pre-stored visual features. As one example, one or more distance measure(s) can be determined between the given instance of pre-stored visual features and the given instance of current visual features 121, and the similarity measure determined as a function of the distance measure(s). As another example, the given instance of current visual features 121 can be processed using a neural network model, that is trained to generate rich embeddings/encodings of vision data, to generate a current embedding (in a lower-dimensional space) of the given instance of current visual features 121. A pre-stored embedding for the given instance of pre-stored visual features can similarly be generated. A distance measure, in embedding space, between the current embedding and the pre-stored embedding can be determined, and the similarity measure determined as a function of the distance measure.

One or more corresponding grasp criteria can be determined for each of the selected instances of pre-stored visual features, based on the grasp criteria being stored in association with the pre-stored visual features. In FIG. 1, determined grasp criteria 123 for only a single selected instance of pre-stored visual features is illustrated for simplicity, but multiple grasp criteria instances (each for a selected instance of pre-stored visual features) can be determined as described herein.

The grasp criteria 123 are provided to candidate grasp pose engine 124. The candidate grasp pose engine 124 utilizes the grasp criteria 123 to generate a candidate grasp pose 125. In some implementations, in generating the candidate grasp pose 125, the candidate grasp pose engine 124 can utilize the grasp criteria 123, the instance of current visual features used in selecting the instance of pre-stored visual features with which the grasp criteria 123 is stored in association, and optionally an initially determined grasp pose (determined by pre-grasp pose engine 112). As one example, the grasp criteria 123 can define a grasp point and component(s) of a grasp orientation relative to the instance of pre-stored visual features with which the grasp criteria 123 is stored in association. The candidate grasp pose engine 124 can determine a candidate grasp pose 125 that includes a candidate grasp point and candidate component(s) of a grasp orientation by transforming the relative definitions, of the grasp point and component(s) of the grasp orientation, in view of the instance of current visual features. Put another way, the grasp criteria 123 can be defined relative to visual features of the pre-stored visual features, and the candidate grasp pose 125 can be generated by transforming those to corresponding visual features of the instance of current visual features. Optionally, the candidate grasp pose engine 124 can select the candidate grasp pose 125, from multiple candidate grasp poses defined by the grasp criteria 123, in view of the initial grasp pose. For example, the candidate grasp pose engine 124 can select the candidate grasp pose 125 based on it being the closest, distance-wise, to the initial grasp pose, amongst the multiple candidate grasp poses defined by the grasp criteria 123.

The candidate grasp pose 125 is provided to the final grasp pose engine 126. The final grasp pose engine 126 determines a final grasp pose 127 based on the candidate grasp pose 125 and/or other candidate grasp pose(s). The other candidate grasp pose(s) can include one(s) generated by candidate grasp pose engine 124 based on other grasp criteria, which can be utilized based on being associated with other selected pre-stored visual features (selected by pre-stored visual features engine 122). Additionally or alternatively, the other candidate grasp pose(s) can include one(s) generated by model engine 118 using one of the machine learning model(s) 158, described in more detail below. When the candidate grasp pose 125 is the only candidate grasp pose, the final grasp pose engine 126 can utilize it as the final grasp pose 127. Optionally, it can be utilized only after first interfacing with model engine 118 to determine that a grasp success measure of the candidate grasp pose 125 satisfies a threshold. As described herein, the model engine 118 can determine the grasp success measure by processing the candidate grasp pose 125 and a corresponding instance of end effector vision data (or corresponding visual features), using one of the machine learning model(s) 158.

When the candidate grasp pose 125 is one of multiple candidate grasp poses, the final grasp pose engine 126 can determine the final grasp pose 127 as a function of one or more of the multiple candidate grasp poses, or selecting one of the multiple candidate grasp poses as the final grasp pose. For example, the final grasp pose engine 126 can determine the final grasp pose 127 by averaging two or more (e.g., all) of the candidate grasp poses. As another example, the final grasp pose engine 126 can interface with the model engine 118 to determine a grasp success measure for each of the multiple candidate grasp poses, and determine the final grasp pose 127 based on one or more of the candidate grasp poses with grasp success measures most indicative of success. For instance, the final grasp pose engine 126 can use the one with the highest grasp success measure as the final grasp pose 127, or can determine the final grasp pose 127 as a function of the N with the N best success measures (where N is an integer greater than 1).

The final grasp pose 127 is provided to the path engine 116. The path engine 116 plans a grasp path 117 (and optionally a trajectory) to the final grasp pose 127 from a current pose of the end effector. The current pose of the end effector can be the actual pose (reached in traversing to the pre-grasp pose), or another pose traversed to from the actual pose in capturing additional instances of end effector vision data. The grasp path 117 can be generated to avoid collisions and optionally in view of one or more optimization criteria (e.g., shortest path or quickest path). The grasp path 117 is provided to the control engine 114, and the control engine 114 can provide control commands to actuators of the robot to cause traversal of the grasp path 117 in association with an attempt of a grasp of the object. For example, the control engine 114 can provide control commands, that correspond to the grasp path 117, to actuators of the robot, and the control engine 114 can cause a grasp to be attempted (e.g., digit(s) closed, vacuum applied) when the end effector arrives at the grasp pose and/or after contact with an object is detected threshold proximity to the object is detected. The grasp can be attempted by, for example, moving actuable components of a grasping end effector toward one another to attempt a grasp. For instance, to attempt a grasp using the robot 180, actuable members 186A and 186B can be moved toward one another until they are either at a fully closed position or a torque reading or other reading measured by torque or other force sensor(s) associated with the members satisfies a threshold.

In some implementations, the path engine 116 determines whether the grasp path 117 (e.g., at least the final grasp pose 127) is kinematically feasible. For example, the path engine 116 can determine whether the final grasp pose 127 and/or other component(s) of the grasp path 117 (and/or a trajectory generated based on the grasp path 117) would violate any joint limits, torque limits, and/or other kinematic limit(s) of the robot. If so, the path engine 116 can determine the grasp path 117 is not kinematically feasible. If not, the path engine 116 can determine the grasp path 117 is kinematically feasible. In those implementations, the path engine 116 can provide the grasp path 117 to control engine 114 for implementation only if it is determined to be kinematically feasible. If the path engine 116 determines the grasp path 117 is not kinematically feasible, the path engine 116 can cause the current grasp attempt to be aborted, and optionally send a corresponding abort signal to control engine 114 and/or other component. When aborted, the control engine 114 (or other engine) can optionally cause a base of the robot to be moved and the grasp attempt reattempted (e.g., by performing another iteration of techniques described above).

Success/data engine 119 can determine whether the grasp attempt of an object is successful, and generate a corresponding grasp success label. For example, the success/data engine 119 can determine whether a grasp is successful based on an end effector "closing extent" when attempting a grasp, end effector torque reading(s) when attempting a grasp, and/or based on capturing additional end effector vision sensor data after the grasp and "lifting". The success/data engine 119 can store, in data database 159, the grasp success label in association with other data from the grasp attempt. For example, the other data from the grasp attempt can include the final grasp pose 127 and instance(s) of end effector vision data (and/or instance(s) of current visual features). The instance(s) of end effector vision data (and/or instance(s) of current visual features) can include the instance(s) used to generate the final grasp pose, and optionally additional instance(s). Success/data engine 119 can determine grasp success labels for multiple grasp attempts and store, in data database 159, the grasp success labels in association with corresponding additional data for each of the multiple grasp attempts.

The training data engine 140 can use the data database 159 in generating training instances and store the training instances in training data database 160. For example, the training data engine 140 can generate a training instance based on data, from data database 159, for a grasp attempt. For instance, the training data engine 140 can include, in the training instance, the grasp success label, the final grasp pose, and/or an instance of visual features (e.g., the instance on which the final grasp pose was determined) for the grasp attempt. In some implementations, the training data engine 140 can perform one or more (e.g., all) of the blocks of method 300 of FIG. 3 (described below).

The training engine 142 uses training instances, of training data 160, to train one or more machine learning model(s) 158. In some implementations, the training engine 142 can perform one or more (e.g., all) of the blocks of method 400 of FIG. 4 (described below). The machine learning model(s) 158, once at least initially trained, can be used by model engine 118 as described above.

As one example, the training data engine 140 can be used to generate training instances that include, as training instance input, an instance of end effector vision data from a corresponding grasp attempt (and/or a corresponding instance of visual features), and, as training instance output, a final grasp pose from the corresponding grasp attempt. The training data engine 140 can generate such training instances based on the grasp success labels for the corresponding training instances indicating that the corresponding grasp attempt was successful. The training engine 142 can then train a corresponding one of the machine learning model(s) 158 based on such training instances. That model, once trained, can be used to process an instance of end effector vision data (and/or a corresponding instance of visual features) and directly predict a final grasp pose.

As another example, the training data engine 140 can be used to generate training instances that include: as training instance input, an instance of end effector vision data from a grasp attempt (and/or a corresponding instance of visual features) and a final grasp pose for the grasp attempt; and, as training instance output, the success label for the grasp attempt (e.g., "1" (successful) or "0" (not successful). The training engine 142 can then train a corresponding one of the machine learning model(s) 158 based on such training instances. That model, once trained, can be used to process an instance of end effector vision data (and/or a corresponding instance of visual features) and a corresponding grasp pose, and generate a predicted success measure that indicates likelihood that the corresponding grasp pose, if implemented and in view of the vision data and/or visual features, would result in a successful grasp.

Figure 2:
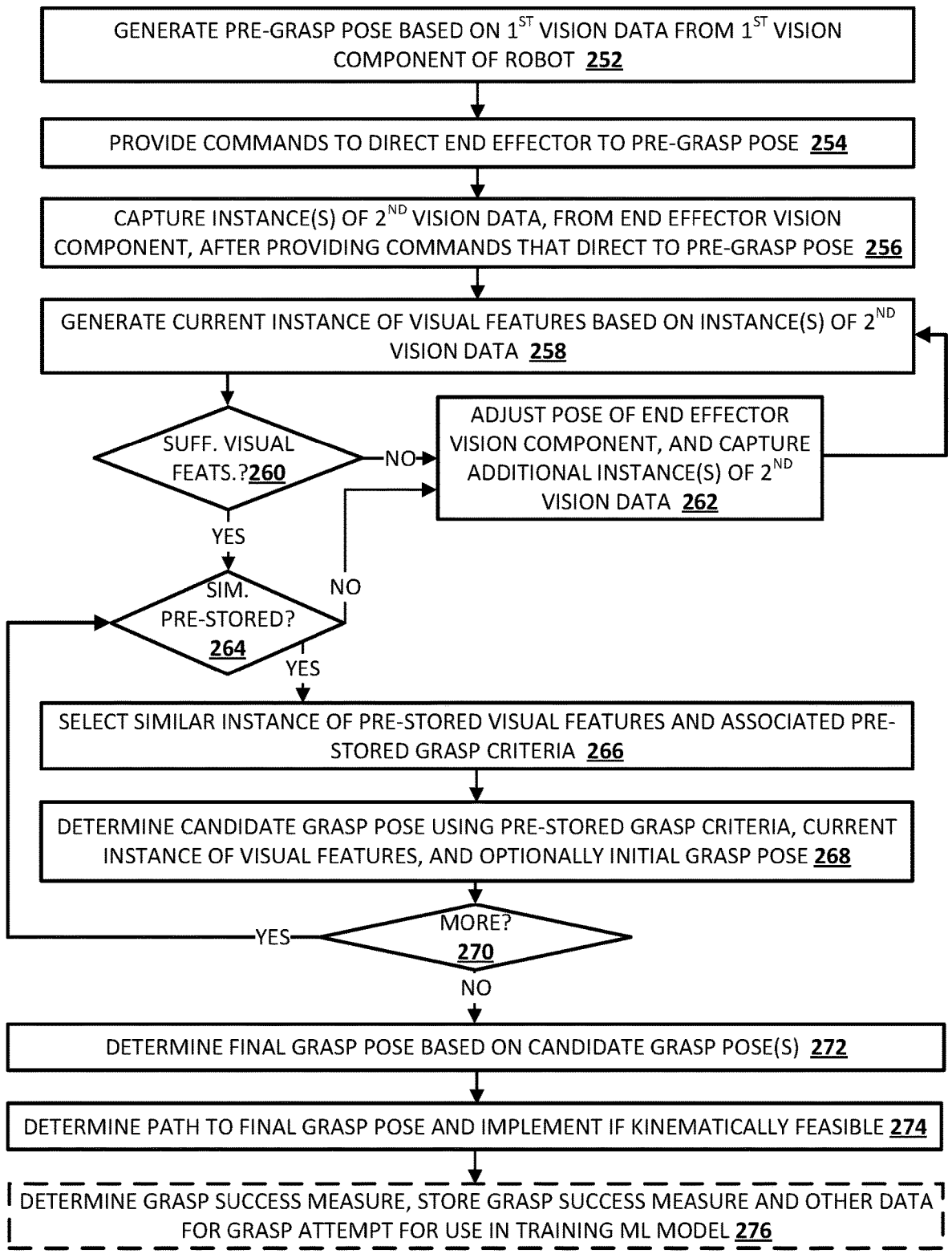
FIG. 2 is a flowchart illustrating an example method of determining a final grasp pose, after an end effector has been traversed to a pre-grasp pose, and implementing a grasp path to the final grasp pose in attempting a grasp.

Turning now to FIG. 2, a flowchart is provided that illustrates an example method 200 of determining a final grasp pose, after an end effector has been traversed to a pre-grasp pose, and implementing a grasp path to the final grasp pose in attempting a grasp, according to various implementations disclosed herein. For convenience, the operations of the flow chart are described with reference to a system that performs the operations. This system may include one or more components, such as one or more engines of grasp system 110 (FIG. 1) and/or processors (e.g., CPU(s), GPU(s), and/or TPU(s)) of a robot. While operations of method 200 are shown in a particular order, this is not meant to be limiting. One or more operations may be reordered, omitted or added.

At block 252, the system generates a pre-grasp pose based on first vision data from a first vision component of a robot. At block 252, the system optionally also generates an initial grasp pose, and can generate the pre-grasp pose based on the initial grasp pose. The first vision component of the robot can be, for example, one that does not translate in unison with an end effector of the robot, such as a vision component on a head or a body of the robot.

At block 254, the system provides commands, to actuators of the robot, to direct the end effector of the robot to the pre-grasp pose determined at block 252.

At block 256, the system captures instance(s) of second vision data, from an end effector vision component, after providing, in block 254, the commands that direct the end effector to the pre-grasp pose. The end effector vision component can be coupled to the end effector, or a link that is upstream and nearby (e.g., one or two links away) from the end effector. The end effector vision component can translate in unison with the end effector of the robot.

At block 258, the system generates a current instance of visual features based on the instance(s) of second vision data. In an initial iteration of block 258, those instance(s) of second vision data are those captured in block 256. In subsequent iteration(s) of block 258 (if any), those instance(s) of second vision data are those captured in a most recent iteration of block 262. The current visual features generated by the system can include edge features, Hough Transform features, and/or other features.

At block 260, the system determines whether the generated current instance of visual features contains sufficient visual features. For example, some instance(s) of second vision data, when processed, can result in no visual features (e.g., when only a flat surface is captured therein) and/or in visual features that are de minimis. For such instance(s), it can be determined that the generated current instance of visual features does not contain sufficient visual features, and the system can proceed to block 262.

At block 262, the system can adjust the pose of the end effector vision component, and capture additional instance(s) of second vision data. Adjusting the pose of the end effector vision component can include adjusting the pose of the end effector, which will result in adjustment of the pose of the end effector vision component (since they translate with one another). Adjusting the pose of the end effector vision component can additionally or alternatively include independently adjusting the orientation of the end effector vision component, when the end effector vision component is independently adjustable independent of movement of the end effector. After block 262, the system returns to block 258, and utilizes the additional instance(s) of second vision data, generated in the most recent iteration of block 262, as the current instance of vision data.

If, at block 260, the system determines the generated current instance of visual features contains sufficient visual features, the system determines, at block 264, whether the current instance of visual features has similarity measure(s), relative to instance(s) of pre-stored visual features that have not yet been selected for the current instance of visual features, that satisfy similarity threshold(s). For example, absolute and/or relative similarity threshold(s) described herein can be considered, and the similarity measure between the current instance of visual features and an instance of pre-stored visual features can be based on distance measure(s) described herein. If the determination at block 264 is no, the system proceeds to block 262. If the determination at block 264 is yes, the system proceeds to block 266.

At block 266, the system selects a similar instance of pre-stored visual features, and associated pre-stored grasp criteria that are stored in association with the selected similar instance of pre-stored visual features. The selected similar instance of pre-stored visual features can be one determined (e.g., at block 264) to have a similarity measure, relative to the current instance of visual features, that satisfies similarity threshold(s).

At block 268, the system determines a candidate grasp pose using the pre-stored grasp criteria selected at a most recent iteration of block 266. The system can determine the candidate grasp pose using the pre-stored grasp criteria, the current instance of visual features, and optionally the initial grasp pose (optionally generated in block 252). For example, the pre-stored grasp criteria can be defined relative to the pre-stored visual features, and the candidate grasp pose determined based on transforming the pre-stored grasp criteria in view of the current visual features. Also, for example, the initial grasp pose can be used in determining a candidate grasp pose, from multiple candidate grasp poses that conform to the pre-stored grasp criteria, based on the candidate grasp pose conforming most closely to the initial grasp pose.

At block 270, the system determines whether to determine more candidate grasp poses. If so, the system proceeds back to block 264. If not, the system proceeds to block 272. In some implementations, block 270 can be omitted. For example, the pre-stored visual features selected at block 266 can be those with the similarity measure most indicative of similarity, and only one candidate grasp pose can be generated based on pre-stored grasp features for the selected pre-stored visual features.

In some implementations or iterations of block 270, whether to determine more candidate grasp poses can be based on whether there are instance(s) of pre-stored visual features that satisfy the similarity threshold for the current instance of visual features, but have not yet been selected for the current instance of visual features. In those implementations or iterations, the decision at block 270 can be yes if so, and no otherwise. Further, in those implementations or iterations the system will proceed back to block 264 and then to block 266 (since the decision at block 264 will be yes).

In some additional or alternative implementations or iterations of block 270, it can be determined to generate one or more candidate grasp poses even if there are not instance(s) of pre-stored visual features that satisfy the similarity threshold for the current instance of visual features, that have not yet been selected for the current instance of visual features that satisfy similarity threshold(s). In those implementations or iterations, the system will proceed back to block 264 and then to block 262 (since the decision at block 264 will be no). For example, in those implementations or iterations it can be determined to determine an additional candidate grasp pose based on additional instance(s) of second vision data, with the end effector vision component at additional pose(s).

When the decision at block 270 is no, the system proceeds to block 272 and determines a final grasp pose based on the candidate grasp pose(s) determined in one or more iterations of block 268. When there is only one candidate grasp pose, the system can utilize it as the final grasp pose. When there are multiple candidate grasp poses, the final system can determine the final grasp pose as a function of one or more of the multiple candidate grasp poses, or select one of the multiple candidate grasp poses as the final grasp pose.

After the system determines the final grasp pose, the system proceeds to block 274 and determines a path to the final grasp pose, and implements at least part of the path if the path is determined to be kinematically feasible. For example, the system can implement at least part of the path by providing control commands, that correspond to the path, to actuators of the robot, and cause a grasp to be attempted when the end effector arrives at the final grasp pose and/or after contact with an object is detected threshold proximity to the object is detected.

At optional block 276, the system determines a grasp success measure for the grasp attempt (of block 274), and stores the grasp success measure and other data for the grasp attempt. The data can be stored for using training at least one machine learning model. For example, the system can automatically determine a binary successful/non-successful grasp success label based on one or more robot sensor readings, and store the grasp success label along with other data for the grasp attempt. The other data from the grasp attempt can include, for example, the final grasp pose and instance(s) of end effector vision data.

Although not illustrated in method 200 for simplicity, it is noted that one or more candidate poses can instead be determined using a trained machine learning model as described herein. Such determined candidate pose(s) can be in addition to, or in lieu of, any determined in iteration(s) of blocks 266 and 268. Further, it is noted that a trained machine learning model can additionally or alternatively be utilized in block 272 in determining a final grasp pose as described herein.

Figure 3:
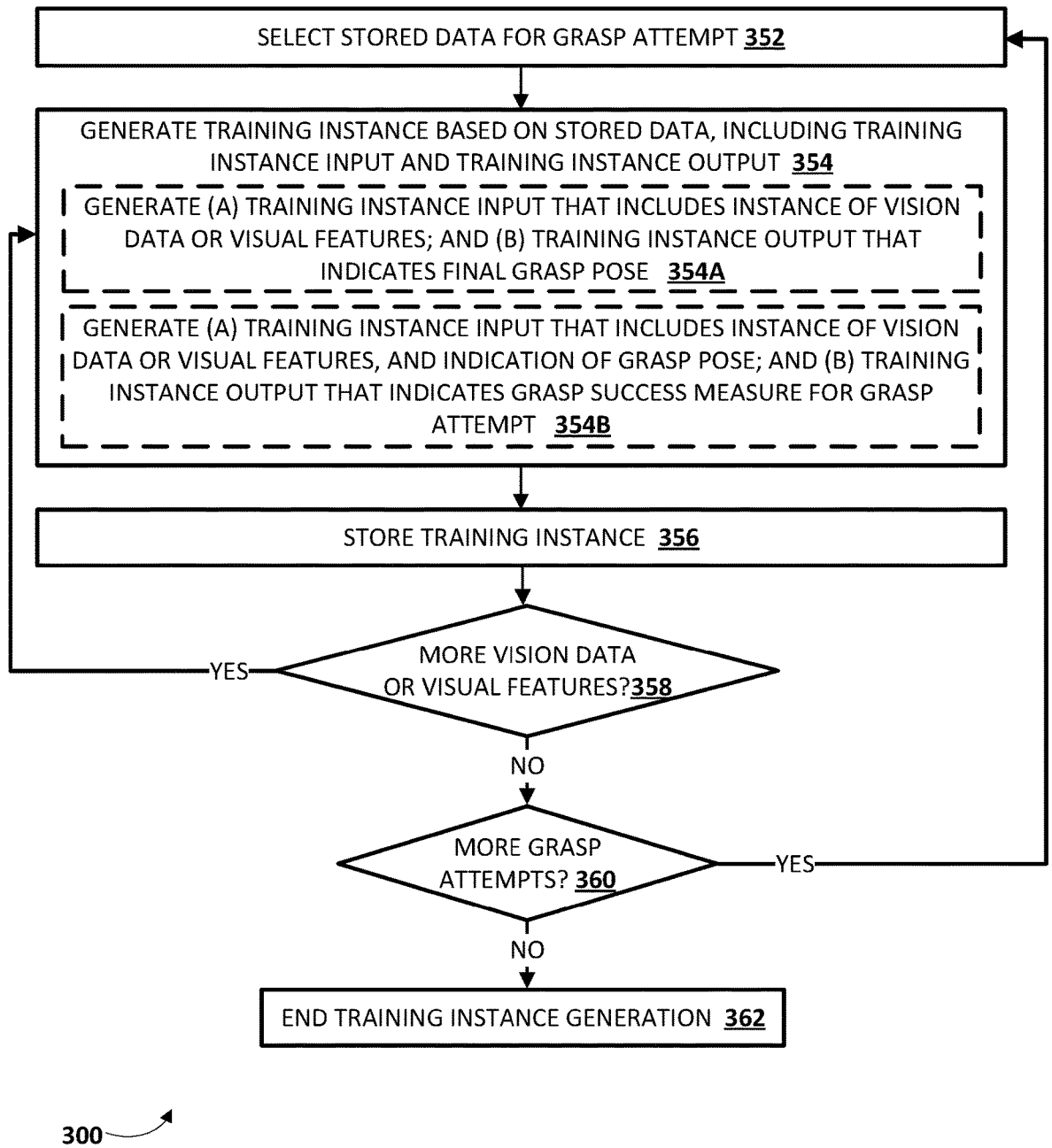
FIG. 3 is a flowchart illustrating an example method of generating training instances based on data stored from grasp attempts performed based on the method of FIG. 2.

Turning now to FIG. 3, a flowchart is provided that illustrates an example method 300 of generating training instances based on data stored from grasp attempts, such as grasp attempts performed based on the method 200 of FIG. 2. For convenience, the operations of the flow chart are described with reference to a system that performs the operations. This system may include one or more components, such as training data engine 142 (FIG. 1) and/or processors (e.g., CPU(s), GPU(s), and/or TPU(s)) of a computing device. While operations of method 300 are shown in a particular order, this is not meant to be limiting. One or more operations may be reordered, omitted or added.

At block 352, the system selects stored data for a grasp attempt, such as data stored in optional block 276 of method 200 of FIG. 2.

At block 354, the system generates a training instance based on the stored data for the grasp attempt. The training instance includes training instance input and training instance output. Sub-blocks 354A and 354B are provided as two separate non-limiting examples of generating a training instance based on stored data for a grasp attempt.

At sub-block 354A, the system generates a training instance with: (A) training instance input that includes an instance of vision data or an instance of visual features; and (B) training instance output that indicates a final grasp pose. The instance of vision data can be end effector vision sensor data from the grasp attempt or visual features based on effector vision sensor data from the grasp attempt. The instance of end effector vision data utilized can be an instance utilized in determining the final grasp pose (i.e., used in determining a candidate grasp pose on which the final grasp pose is based), or can be an instance that was not utilized in determining the final grasp pose. The training instance output can indicate the final grasp pose by, for example, indicating a spatial region that corresponds to the grasp point of the final grasp pose, and optionally indicating orientation component(s) of the final grasp pose (if any). As an example, the instance of end effector vision data (or visual features) can be 256 pixels by 256 pixels, and include N channels (where N is an integer and is 1, or greater than 1). In such an example, the training instance output can also be 256 by 256 and can include a one-hot value that corresponds to the final grasp pose. The training instance output can optionally include, along with the one-hot value, value(s) that indicate the orientation component(s), such as an encoding of pitch, yaw, and/or roll. The example training instance of block 354A can be used in training a machine learning model that can be used to process an instance of end effector vision data (and/or visual features based thereon) and generate a prediction of a final grasp pose. In some implementations, when the instance of vision data (or instance of visual features) used in the training instance input is one that was not utilized in determining the final grasp pose, the final grasp pose indicated in the training instance output can be one that is adjusted to reflect the final grasp pose relative to the instance of vision data. Put another way, such an adjusted final grasp pose can still indicate the same final grasp pose, but can be adjusted, relative to the stored final grasp pose of the grasp attempt, so that it reflects the final grasp pose relative to the instance of vision data (or instance of visual features) of the training instance input. Optionally, the training instances of block 354A are only generated based on data for those grasp attempts with a successful grasp label.

At sub-block 354B, the system generates a training instance with: (A) training instance input that includes an instance of vision data or an instance of visual features, and an indication of a final grasp pose; and (B) training instance output that indicates the grasp success measure for the grasp attempt (e.g., a binary measure of either successful or not successful). The instance of vision data can be end effector vision sensor data from the grasp attempt or visual features based on effector vision sensor data from the grasp attempt. The instance of end effector vision data utilized can be an instance utilized in determining the final grasp pose (i.e., used in determining a candidate grasp pose on which the final grasp pose is based), or can be an instance that was not utilized in determining the final grasp pose. The final grasp pose can be indicated by, for example, indicating a spatial region of the vision data or visual features (e.g., a pixel thereof) that corresponds to the grasp point of the final grasp pose, and optionally indicating orientation component(s) of the final grasp pose (if any). As an example, the instance of end effector vision data (or visual features) can be 256 pixels by 256 pixels, and include N channels (where N is an integer and is 1, or greater than 1). In such an example, the training instance input can include those N channels, and an extra channel that indicates the position of the final grasp pose (e.g., relative to the instance of end effector vision data, or instance of visual features) and optionally an encoding of orientation component(s) of the final grasp pose. The example training instance of block 354B can be used in training a machine learning model that can approximate a value function, and used to process an instance of end effector vision data (and/or visual features based thereon) along with a candidate grasp pose, and generate a predicted grasp success measure. In some implementations, when the instance of vision data (or instance of visual features) used in the training instance input is one that was not utilized in determining the final grasp pose, the final grasp pose indicated in the training instance input can be one that is adjusted to reflect the final grasp pose relative to the instance of vision data. Put another way, such an adjusted final grasp pose can still indicate the same final grasp pose, but can be adjusted, relative to the stored final grasp pose of the grasp attempt, so that it reflects the final grasp pose relative to the instance of vision data (or instance of visual features) of the training instance input. For example, assume the training instance inputs each include an instance of visual features that is 256 by 256 pixels and includes N channels, and each include an extra channel that indicates the position of the final grasp pose. For a first training instance input from a given grasp attempt with an instance of visual features from a first pose of the end effector vision sensor, the final grasp pose of the grasp attempt can be represented by a first pixel in the extra channel. For a second training instance input from the same given grasp attempt with another instance of visual features from a second pose of the end effector vision sensor, the final grasp pose of the grasp attempt can be represented by a separate second pixel in the extra channel. The first pixel and the second pixel in the extra channels in the two different training instances both represent the same final grasp pose, but different pixels are utilized due to the different poses for the instances of visual features. It is noted that the training instances of block 354B can be generated based on data for those grasp attempts with successful grasp labels, as well as those with unsuccessful grasp labels.

At block 356, the system stores the training instance generated in block 354, and proceeds to block 358.

At block 358, the system determines whether there is another instance of vision data or another instance of visual features in the stored data for the grasp attempt. If so, the system can proceed back to block 354 and generate another training instance based on the same grasp attempt, but using a different instance of vision data or a different instance of visual features (i.e., an instance captured at an additional pose), while keeping the grasp success label the same. This can result in generating multiple training instances based on data for a single grasp attempt, with each training instance including different end effector vision data or different end effector visual features. Moreover, where the final grasp pose is defined relative to an end effector pose or a current instance of vision data (or visual features), the final grasp pose used with a training instance that includes a different instance of vision data (or visual features) captured at an additional pose, can be one that has been offset in view of that additional pose. Put another way, the final grasp pose used in a grasp attempt can be determined relative to a given instance of visual features captured at a given pose of an end effector and corresponding pose of the end effector vision sensor. That final grasp pose used in the grasp attempt can be used in a training instance that includes the given instance of visual features. However, for an additional training instance that includes additional visual features from the grasp attempt, captured at a nearby pose, the final grasp pose used in the additional training instance can be one that is offset relative to the final grasp pose used in the grasp attempt (i.e., offset in view of the nearby pose from which the additional visual features were captured). Block 358 can optionally be omitted.

If the decision at block 360 is no, the system proceeds to block 360 and determines whether to process more grasp attempts. If so, the system proceeds back to block 352 and selects stored data for another grasp attempt. If not, the system proceeds to block 362 and ends the training instance generation. In some implementations, the decision at block 360 can be yes if there are additional unprocessed grasp attempts and/or if a threshold quantity of training instances have not yet been generated and/or if a threshold duration of generating training instances has not yet passed.

Figure 4:
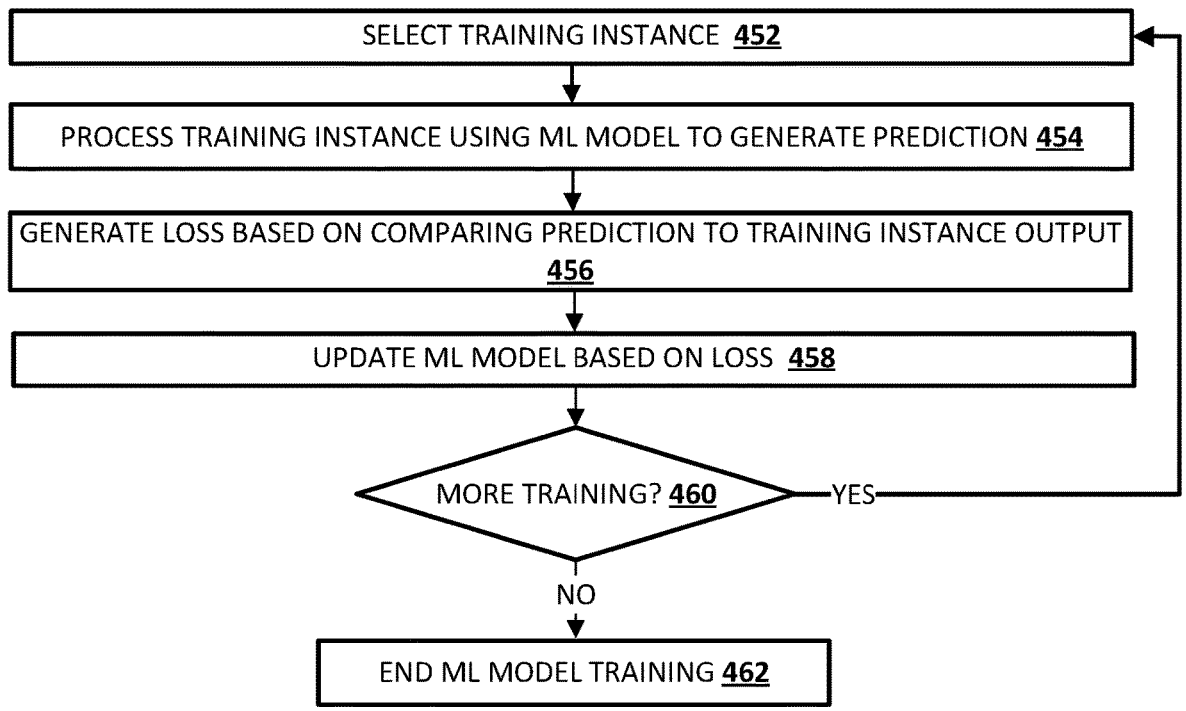
FIG. 4 is a flowchart illustrating an example method of training a machine learning model based on training instances generated based on the method of FIG. 3.

Turning now to FIG. 4, a flowchart is provided that illustrates an example method 400 of training a machine learning model based on training instances, such as training instance generated based on the method 300 of FIG. 3. The machine learning model can be, for example, a neural network model, such as a neural network model that includes one or more convolutional neural network (CNN) layers. For convenience, the operations of the flow chart are described with reference to a system that performs the operations. This system may include one or more components, such as training engine 140 (FIG. 1) and/or processors (e.g., CPU(s), GPU(s), and/or TPU(s)) of a computing device. While operations of method 400 are shown in a particular order, this is not meant to be limiting. One or more operations may be reordered, omitted or added.

At block 452, the system selects a training instance, such as a training instance stored in an iteration of block 356 of method 300 of FIG. 3.

At block 454, the system processes the training instance, using a corresponding machine learning model (e.g., one with input and output dimensions that conform to the training instance input and training instance output), to generate a prediction. For example, when the training instances are generated based on sub-block 354A of method 300 of FIG. 3, the prediction can be a predicted final grasp pose. As another example, when the training instances are generated based on sub-block 354B of method 300 of FIG. 3, the prediction can be a predicted success measure (e.g., a value from 0 to 1).

At block 456, the system generates a loss based on comparing the prediction to training instance output of the selected training instance. For example, the system can generate a cross-entropy loss, a mean-squared error loss, or a loss based on another loss function.

At block 458, the system updates the machine learning model based on the loss generated at block 456. For example, the system can back propagate the loss to update weights of the machine learning model. In some batch learning implementations, block 458 is not performed after each iteration of block 456 but, rather, only after multiple iterations of block 456 are performed, in which case an overall loss can be determined based on multiple losses for multiple iterations of block 456, and the overall loss utilized to update the machine learning model.

At block 460, the system determines whether to perform more training. If the decision is yes, the system proceeds to block 452 and selects another training instance. If the decision is no, the system proceeds to block 462 and ends training of the machine learning model. In some implementations, the decision at block 460 can be yes if there are additional unprocessed training instances and/or if a threshold quantity of training instances have not yet been processed and/or if a threshold duration of training has not yet passed.

After training of the machine learning model ends at block 462, the trained machine learning model can be used by a grasp system (e.g., by model engine 118 of grasp system 110). For example, the trained machine learning model can be locally stored at a robot, and utilized by processor(s) of a robot as described herein. For instance, a grasp pose prediction machine learning model can be used in generating final grasp poses (e.g., in lieu of utilization of pre-stored visual features and associated grasp criteria) and/or in generating candidate pose(s) (e.g., that can be considered along with those generated utilizing pre-stored visual features and associated grasp criteria). Also, for instance, a grasp success measure prediction machine learning model can be used in evaluating candidate pose(s) (e.g., in view of predicted grasp success measures generated using the machine learning model). Further training of the machine learning model can optionally occur even after initial deployment of the machine learning model, through additional iterations of method 400 and using additional training instances (e.g., generated based on grasp attempt(s) performed based on final grasp pose(s) determined based at least in part on the deployed machine learning model). The further trained machine learning model can then replace the initially deployed machine learning model.

Figure 5:
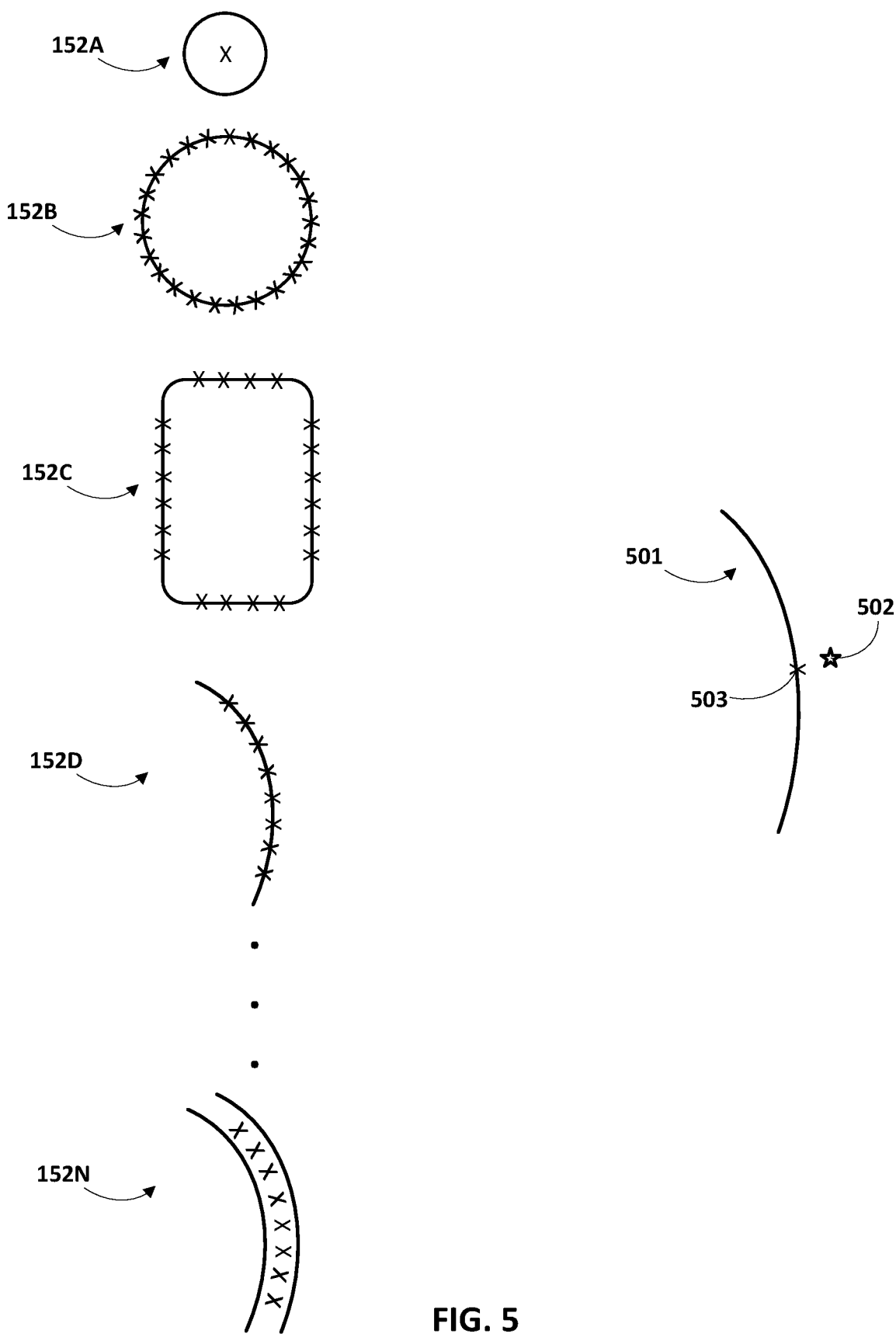
FIG. 5 illustrates some examples of pre-stored visual features and associated grasp criteria, and illustrates an example of current visual features, an initial grasp pose, and a candidate grasp pose.

Turning now to FIG. 5, some non-limiting examples of pre-stored visual features and associated grasp criteria 152A-N are illustrated. The pre-stored visual features and associated grasp criteria 152A-N are non-limiting representations of instances of pre-stored visual features and associated grasp criteria that can be stored in pre-stored visual feature database 152 (FIG. 1). FIG. 5 also illustrates a non-limiting example of current visual features 501, an initial grasp pose 502, and a candidate grasp pose 503.

The solid edges of pre-stored visual features and associated grasp criteria 152A-N indicate the visual features, and the X(s) indicate the grasp pose criteria for the visual features. Although indicated as solid edges, it is noted that the visual features can be stored as non-continuous features (e.g., spatially related but non-connected points) and/or in other manners. Moreover, although indicated as X(s) and visually, it is noted that the grasp pose criteria can be non-visually related to corresponding visual features and/or visually related in other manners. Further, it is noted that although indicated as grasp points in FIG. 5, grasp pose criteria can additionally define component(s) of orientation as described herein.

Pre-stored visual features and associated grasp criteria 152A includes a visual feature of a small circle, and grasp criteria that indicate a grasp point at a center of the small circle. Pre-stored visual features and associated grasp criteria 152B includes a visual feature of a larger circle, and grasp criteria that indicate grasp points along a circumference of the larger circle. It is noted that while multiple grasp points are indicated, the grasp criteria can alternatively define that any point along the circumference is a valid grasp point. Pre-stored visual features and associated grasp criteria 152C includes a visual feature of a larger rounded rectangle, and grasp criteria that indicate grasp points along parts of the edge but, notably, not near the rounded corners of the rounded rectangle. It is noted that while multiple grasp points are indicated, the grasp criteria can alternatively define that any point along four continuous segments of the edge (i.e., those that are not in the rounded corners) is a valid grasp point. Pre-stored visual features and associated grasp criteria 152D includes a visual feature of a single arc segment, and grasp criteria that indicate grasp points along the arc segment, but not at the distal ends of the arc segment. It is noted that while multiple grasp points are indicated, the grasp criteria can alternatively define that any point along a portion of the arc segment (i.e., between the distal ends) is a valid grasp point. Pre-stored visual features and associated grasp criteria 152N includes a visual feature of two equidistant arc segments, and grasp criteria that indicate grasp points centered between the equidistant arc segments, but not at the distal ends of the equidistant arc segments. It is noted that while multiple grasp points are indicated, the grasp criteria can alternatively define that any point centered between the equidistant arc segments (i.e., between the distal ends) is a valid grasp point.

Although particular pre-stored visual features and associated grasp criteria 152A-N are illustrated in FIG. 5, it is noted that additional and/or alternative visual features and/or grasp criteria can be included in pre-stored visual features database 152 (FIG. 1).

The current visual features 501 of FIG. 5 include a single arc segment, and an initial grasp pose 502 is indicated and is notably not on the single arc segment. The candidate grasp pose 503 can be determined, for example, by determining the current visual features 501 satisfy similarity threshold(s) to the pre-stored visual features of pre-stored visual features and associated grasp criteria 152D. Further, the candidate grasp pose 503 can be determined to be on the single arc segment of the current visual features, based on the grasp criteria of pre-stored visual features and associated grasp criteria 152D defining the grasp points as being on the arc segment. Although the arc segment of current visual feature 501 varies from that of 152D, the candidate grasp pose can be translated to the arc segment of current visual features 501. In various implementations the candidate grasp pose 503 can be determined, in lieu of other candidate grasp poses that are also on the arc segment of current visual features 501, based on it being most proximal distance-wise to the initial grasp pose 502. The candidate grasp pose 503 can be used in generating the final grasp pose (e.g., the final grasp pose can conform thereto), leading to correction of the initial grasp pose 503 and increasing the probability of successfully grasping the object corresponding to the current visual features 501.

Figure 6:
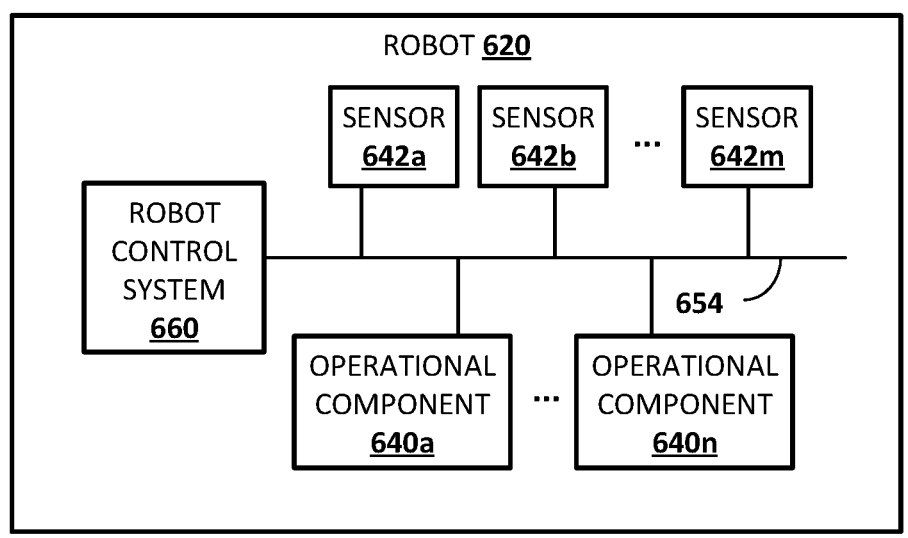
FIG. 6 schematically depicts an example architecture of a robot.

Turning now to FIG. 6, an example architecture of a robot 620 is schematically depicted. The robot 620 includes a robot control system 660, one or more operational components 640a-640n, and one or more sensors 642a-642m. The sensors 642a-642m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 642a-m are depicted as being integral with robot 620, this is not meant to be limiting. In some implementations, sensors 642a-m may be located external to robot 620, e.g., as standalone units.

Operational components 640a-640n may include, for example, one or more end effectors (e.g., grasping end effectors) and/or one or more servo motors or other actuators to effectuate movement of one or more components of the robot. For example, the robot 620 may have multiple degrees of freedom and each of the actuators may control actuation of the robot 620 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 620. In some implementations, the robot 620 may comprise a "brain box" that may include all or aspects of the control system 660. For example, the brain box may provide real time bursts of data to the operational components 640a-n, with each of the real time bursts comprising a set of one or more control commands that dictate, inter alia, the parameters of motion (if any) for each of one or more of the operational components 640a-n. In some implementations, the robot control system 660 may perform one or more aspects of method 200 and/or other method(s) described herein.

As described herein, in some implementations all or aspects of the control commands generated by control system 660 in positioning an end effector to grasp an object may be based on control commands generated in accordance with grasping techniques described herein. Although control system 660 is illustrated in FIG. 6 as an integral part of the robot 620, in some implementations, all or aspects of the control system 660 may be implemented in a component that is separate from, but in communication with, robot 620. For example, all or aspects of control system 660 may be implemented on one or more computing devices that are in wired and/or wireless communication with the robot 620, such as computing device 710.

Figure 7:
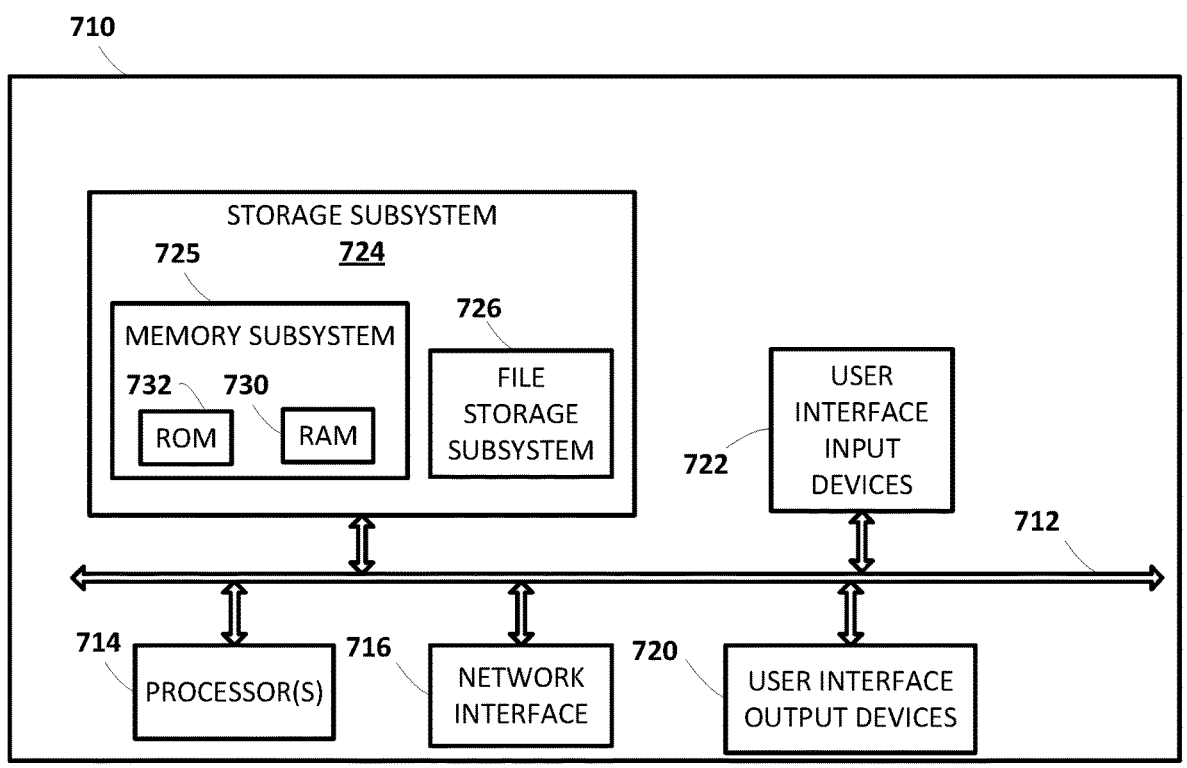
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 3 and/or the method of FIG. 4.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors of a robot is provided and includes generating a pre-grasp pose for grasping of an object that is in an environment of the robot. Generating the pre-grasp pose is based on first vision data from a first vision component of the robot. The method further includes providing, to actuators of the robot, commands that direct an end effector of the robot to traverse to the pre-grasp pose. The method further includes, subsequent to providing the commands that direct the end effector of the robot to traverse to the pre-grasp pose, and prior to attempting a grasp of the object using the end effector: capturing one or more instances of second vision data using a second vision component of the robot; generating current visual features based on at least one of the instances of the second vision data; selecting, from a plurality of discrete pre-stored visual features, at least given pre-stored visual features based on the given pre-stored visual features satisfying one or more conditions relative to the current visual features; determining a candidate grasp pose using one or more grasp pose criteria based on the grasp pose criteria being stored in association with the selected given pre-stored visual features; determining a final grasp pose, for grasping of the object, based at least in part on the candidate grasp pose; and calculating a path to move the end effector to the final grasp pose. The final grasp pose can define at least a three-dimensional (3D) point. The second vision component of the robot can be coupled to (e.g., integrated with and/or a separate component from but affixed to) the end effector or coupled to an additional robot link near the end effector. Translation of the end effector can cause corresponding translation of the second vision component. The method further includes, after determining the final grasp pose, and in response to determining the path is kinematically feasible: providing, to the actuators of the robot, commands that cause the end effector of the robot to traverse the path and attempt a grasp of the object.

These and other implementations of the technology can include one or more of the following features.

In some implementations, the method further includes generating, based on the first vision data from the first vision component of the robot, an initial grasp point for grasping of the object. In those implementations, determining the final grasp pose based at least in part on the candidate grasp pose can be responsive to determining the 3D point of the candidate grasp pose satisfies a distance criterion relative to the initial grasp point. In some versions of those implementations, determining the final grasp pose includes determining the final grasp pose based on only the candidate grasp pose. In some of those versions, the final grasp pose conforms to the candidate grasp pose.

In some implementations, the grasp pose criteria include a relative grasp point that is relative to the pre-stored visual features, and determining the candidate grasp pose using the one or more grasp pose criteria includes: determining a current grasp point using the relative point and the current visual features; and determining the 3D point of the grasp pose based on the current grasp point. In some versions of those implementations, the method further includes generating, based on the first vision data from the first vision component of the robot, an initial grasp point for grasping of the object. In those versions, determining the 3D point is further based on the initial grasp point. In some additional or alternative versions of those implementations, the given pre-stored visual features define an arcuate edge, the relative grasp point is on the arcuate edge, and determining the current grasp point position using the relative grasp point position and the current visual features includes determining the current grasp point based on it being on a current arcuate edge of the current visual features. In some other additional or alternative versions of those implementations, the given pre-stored visual features define an ellipse, the relative grasp point is a center of the ellipse, and determining the current grasp point using the relative grasp point position and the current visual features comprises determining the current grasp point based on it being at a center of a current ellipse of the current visual features.

In some implementations, the 3D point is a center point of the candidate grasp pose.

In some implementations, generating the current visual features is based on a given instance of the instances of the second vision data. In some of those implementations, the method further includes, subsequent to providing the commands that direct the end effector of the robot to traverse to the pre-grasp pose, and prior to attempting a grasp of the object using the end effector: generating additional current visual features based on an additional instance of the instances of the second vision data, where the additional instance of the second vision data is captured at an additional pose, of the end effector, that is navigated to after the pre-grasp pose; selecting, from the plurality of discrete pre-stored visual features, at least the given pre-stored visual features based on the given pre-stored visual features satisfying one or more conditions relative to the additional current visual features; and determining an additional candidate grasp pose using the additional instance of the vision data and using the one or more grasp pose criteria based on the grasp pose criteria being stored in association with the selected given pre-stored visual features. In some versions of those implementations, determining the final grasp pose includes determining the final grasp pose as a function of the candidate grasp pose and the additional candidate grasp pose. In some of those versions, determining the final grasp pose as the function of the candidate grasp pose and the additional candidate grasp pose includes averaging the candidate grasp pose and the final candidate grasp pose. In some of those versions, the given instance of the vision data is captured when the end effector is at the pre-grasp pose.

In some implementations, the method further includes, in response to determining the path is not kinematically feasible: aborting the grasping of the object.

In some implementations, the final grasp pose further defines an orientation of the end effector.

In some implementations, the method further includes, after providing, to the actuators of the robot, commands that cause the end effector of the robot to traverse the path, and attempt the grasp of the object: determining whether the grasp of the object was successful; generate a training instance that includes: the current visual features or the instance of the second vision data; an indication of the final grasp pose; and a grasp success label that is based on whether the grasp of the object was successful; and using the training instance in training a machine learning model. In some of those implementations, the method further includes, after providing, to the actuators of the robot, commands that cause the end effector of the robot to traverse the path, and attempt the grasp of the object: generate an additional training instance that includes: an additional instance of current visual features determined based on an additional instance of the second vision data captured at an additional pose of the second vision component or the additional instance of the second vision data; an additional indication of the final grasp pose, and the grasp success label that is based on whether the grasp of the object was successful; and using the additional training instance in training the machine learning model. In some versions of those implementations, the indication of the final grasp pose and the additional indication of the final grasp pose can differ from one another, but still both reflect the final grasp pose. In some of those versions, the indication of the final grasp pose can be defined relative to the current visual features or the instance of second vision data, and the additional indication of the final grasp pose can be defined relative to the additional instance of current visual features or the additional instance of second vision data, and can differ as a result of the instance of second vision data and the additional instance of second vision data being captured from different poses of the second vision component.

In some implementations, a method implemented by one or more processors of a robot is provided and includes generating, based on first vision data from a first vision component of the robot, a pre-grasp pose and an initial grasp pose for grasping of an object that is in an environment of the robot. The method further includes providing, to actuators of the robot, commands that direct an end effector of the robot to traverse to the pre-grasp pose. The method further includes, subsequent to providing the commands that direct the end effector of the robot to traverse to the pre-grasp pose, and prior to attempting a grasp of the object using the end effector: capturing one or more instances of second vision data using a second vision component of the robot; generating current visual features based on at least one of the instances of the second vision data; generating a candidate grasp pose by applying one or more pre-stored grasp pose criteria to the current visual features; determining that the candidate grasp pose satisfies a distance threshold relative to the initial grasp pose; in response to determining that the candidate grasp pose satisfies the distance threshold relative to the initial grasp pose, determining a final grasp pose, for grasping of the object, based at least in part on the candidate grasp pose; and calculating a path to move the end effector to the final grasp pose. The second vision component of the robot can be coupled to the end effector and translation of the end effector can cause corresponding translation of the second vision component. The method further includes, after determining the final grasp pose: providing, to the actuators of the robot, commands that cause the end effector of the robot to traverse the path, and attempt a grasp of the object.

These and other implementations of the technology can include one or more of the following features.

In some implementations, the initial grasp pose defines a point in three-dimensional (3D) space, and a value for at least one component of orientation, and the final grasp pose defines an additional point in 3D space and an additional value for the at least one component of orientation.

In some implementations, the attempt of the grasp of the object is responsive to arriving at the final grasp pose, or detecting contact in traversing to the final grasp pose.

What is claimed is:

1. A method implemented by one or more processors of a robot, the method comprising:
   generating, based on first vision data from a first vision component of the robot, a pre-grasp pose for grasping of an object that is in an environment of the robot;
   providing, to actuators of the robot, commands that direct an end effector of the robot to traverse to the pre-grasp pose;
   subsequent to providing the commands that direct the end effector of the robot to traverse to the pre-grasp pose, and prior to attempting a grasp of the object using the end effector:

capturing one or more instances of second vision data using a second vision component of the robot,
wherein the second vision component of the robot is coupled to the end effector or coupled to an additional robot link near the end effector, and
wherein translation of the end effector causes corresponding translation of the second vision component;
generating current visual features based on at least one of the instances of the second vision data,
selecting, from a plurality of discrete pre-stored visual features, at least given pre-stored visual features based on the given pre-stored visual features satisfying one or more conditions relative to the current visual features,
determining a candidate grasp pose using one or more grasp pose criteria based on the grasp pose criteria being stored in association with the selected given pre-stored visual features,
determining a final grasp pose, for grasping of the object, based at least in part on the candidate grasp pose, wherein the final grasp pose defines at least a three-dimensional (3D) point, and
calculating a path to move the end effector to the final grasp pose; and
after determining the final grasp pose, and in response to determining the path is kinematically feasible:
providing, to the actuators of the robot, commands that cause the end effector of the robot to traverse the path and attempt a grasp of the object.

2. The method of claim 1, further comprising:
generating, based on the first vision data from the first vision component of the robot, an initial grasp point for grasping of the object;
wherein determining the final grasp pose based at least in part on the candidate grasp pose is responsive to determining the 3D point of the candidate grasp pose satisfies a distance criterion relative to the initial grasp point.

3. The method of claim 2, wherein determining the final grasp pose comprises determining the final grasp pose based on only the candidate grasp pose, and wherein the final grasp pose conforms to the candidate grasp pose.

4. The method of claim 1, wherein the grasp pose criteria include a relative grasp point that is relative to the pre-stored visual features, and wherein determining the candidate grasp pose using the one or more grasp pose criteria comprises:
determining a current grasp point using the relative point and the current visual features; and
determining the 3D point of the grasp pose based on the current grasp point.

5. The method of claim 4, further comprising:
generating, based on the first vision data from the first vision component of the robot, an initial grasp point for grasping of the object;
wherein determining the 3D point is further based on the initial grasp point.

6. The method of claim 4, wherein the given pre-stored visual features define an arcuate edge, wherein the relative grasp point is on the arcuate edge, and wherein determining the current grasp point position using the relative grasp point position and the current visual features comprises determining the current grasp point based on it being on a current arcuate edge of the current visual features.

7. The method of claim 4, wherein the given pre-stored visual features define an ellipse, wherein the relative grasp point is a center of the ellipse, and wherein determining the current grasp point using the relative grasp point position and the current visual features comprises determining the current grasp point based on it being at a center of a current ellipse of the current visual features.

8. The method of claim 4, wherein the 3D point is a center point of the candidate grasp pose.

9. The method of claim 1, wherein generating the current visual features is based on a given instance of the instances of the second vision data.

10. The method of claim 9, further comprising, subsequent to providing the commands that direct the end effector of the robot to traverse to the pre-grasp pose, and prior to attempting a grasp of the object using the end effector:
generating additional current visual features based on an additional instance of the instances of the second vision data, wherein the additional instance of the second vision data is captured at an additional pose, of the end effector, that is navigated to after the pre-grasp pose;
selecting, from the plurality of discrete pre-stored visual features, at least the given pre-stored visual features based on the given pre-stored visual features satisfying one or more conditions relative to the additional current visual features; and
determining an additional candidate grasp pose using the additional instance of the vision data and using the one or more grasp pose criteria based on the grasp pose criteria being stored in association with the selected given pre-stored visual features;
wherein determining the final grasp pose comprises determining the final grasp pose as a function of the candidate grasp pose and the additional candidate grasp pose.

11. The method of claim 10, wherein determining the final grasp pose as the function of the candidate grasp pose and the additional candidate grasp pose comprises averaging the candidate grasp pose and the final candidate grasp pose.

12. The method of claim 10, wherein the given instance of the vision data is captured when the end effector is at the pre-grasp pose.

13. The method of claim 1, further comprising:
in response to determining the path is not kinematically feasible:
aborting the grasping of the object.

14. The method of claim 1, wherein the final grasp pose further defines an orientation of the end effector.

15. The method of claim 1, further comprising, after providing, to the actuators of the robot, commands that cause the end effector of the robot to traverse the path, and attempt the grasp of the object:
determining whether the grasp of the object was successful;
generate a training instance that includes:
the current visual features or the instance of the second vision data,
an indication of the final grasp pose, and
a grasp success label that is based on whether the grasp of the object was successful; and
using the training instance in training a machine learning model.

16. A method implemented by one or more processors of a robot, the method comprising:
generating, based on first vision data from a first vision component of the robot, a pre-grasp pose and an initial grasp pose for grasping of an object that is in an environment of the robot;

providing, to actuators of the robot, commands that direct an end effector of the robot to traverse to the pre-grasp pose;

subsequent to providing the commands that direct the end effector of the robot to traverse to the pre-grasp pose, and prior to attempting a grasp of the object using the end effector:

capturing one or more instances of second vision data using a second vision component of the robot, wherein the second vision component of the robot is coupled to the end effector, and wherein translation of the end effector causes corresponding translation of the second vision component;

generating current visual features based on at least one of the instances of the second vision data, generating a candidate grasp pose by applying one or more pre-stored grasp pose criteria to the current visual features;

determining that the candidate grasp pose satisfies a distance threshold relative to the initial grasp pose;

in response to determining that the candidate grasp pose satisfies the distance threshold relative to the initial grasp pose, determining a final grasp pose, for grasping of the object, based at least in part on the candidate grasp pose, and calculating a path to move the end effector to the final grasp pose; and after determining the final grasp pose:

providing, to the actuators of the robot, commands that cause the end effector of the robot to traverse the path, and attempt a grasp of the object.

17. The method of claim 16, wherein the initial grasp pose defines a point in three-dimensional (3D) space, and a value for at least one component of orientation, and wherein the final grasp pose defines an additional point in 3D space and an additional value for the at least one component of orientation.

18. The method of claim 17, wherein the attempt of the grasp of the object is responsive to arriving at the final grasp pose, or detecting contact in traversing to the final grasp pose.

19. A robot comprising:

an end effector;

actuators;

a first vision component coupled to a head or a body of the robot;

a second vision component coupled to the end effector and translating with translation of the end effector;

one or more processors that execute stored instructions to:

generate, based on first vision data from the first vision component, a pre-grasp pose for grasping of an object that is in an environment of the robot;

provide, to the actuators, commands that direct the end effector to traverse to the pre-grasp pose;

subsequent to providing the commands that direct the end effector of the robot to traverse to the pre-grasp pose, and prior to attempting a grasp of the object using the end effector:

capture one or more instances of second vision data using the second vision component;

generating current visual features based on at least one of the instances of the second vision data, select, from a plurality of discrete pre-stored visual features, at least given pre-stored visual features based on the given pre-stored visual features satisfying one or more conditions relative to the current visual features, determine a candidate grasp pose using one or more grasp pose criteria based on the grasp pose criteria being stored in association with the selected given pre-stored visual features, determine a final grasp pose, for grasping of the object, based at least in part on the candidate grasp pose, and calculate a path to move the end effector to the final grasp pose; and after determining the final grasp pose, and in response to determining the path is kinematically feasible:

provide, to the actuators of the robot, commands that cause the end effector of the robot to traverse the path, and attempt a grasp of the object.

20. The method of claim 19, wherein the second vision component comprises a monographic camera.

* * * * *